(12) United States Patent
Ali et al.

(10) Patent No.: US 12,022,412 B2
(45) Date of Patent: Jun. 25, 2024

(54) CONTROL INFORMATION FOR A DIGITALLY CONTROLLED SURFACE HAVING REFLECTIVE ELEMENTS

(71) Applicant: Lenovo (Singapore) PTE. LTD., New Tech Park (SG)

(72) Inventors: Ali Ramadan Ali, Munich (DE); Ankit Bhamri, Rödermark (DE); Karthikeyan Ganesan, Nauheim (DE); Sher Ali Cheema, Ilmenau (DE); Soumya Somasekharan Nambiar, Aachen (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 190 days.

(21) Appl. No.: 17/390,618

(22) Filed: Jul. 30, 2021

(65) Prior Publication Data

US 2023/0030324 A1 Feb. 2, 2023

(51) Int. Cl.
*H04W 56/00* (2009.01)
*H04B 7/0456* (2017.01)
(Continued)

(52) U.S. Cl.
CPC ........ *H04W 56/001* (2013.01); *H04B 7/0456* (2013.01); *H04B 7/0617* (2013.01); *H04L 5/0044* (2013.01); *H04L 5/0053* (2013.01)

(58) Field of Classification Search
CPC . H04W 56/001; H04B 7/0456; H04B 7/0617; H04B 7/04013; H04B 7/15528;
(Continued)

(56) References Cited

U.S. PATENT DOCUMENTS

2019/0253308 A1 8/2019 Huang et al.
2022/0278738 A1* 9/2022 Dai ............... H04B 7/0695
(Continued)

FOREIGN PATENT DOCUMENTS

CN 111416646 A 7/2020
CN 111464223 A 7/2020
(Continued)

OTHER PUBLICATIONS

"Adaptive Transmission for Reconfigurable Intelligent Surface-Assisted OFDM Wireless Communications", Lin et al, IEEE Nov. 2020 (Year: 2020).*
(Continued)

*Primary Examiner* — Habte Mered
(74) *Attorney, Agent, or Firm* — Kunzler Bean & Adamson

(57) ABSTRACT

Apparatuses, methods, and systems are disclosed for control information for a digitally controlled surface having reflective elements. One method (1300) includes transmitting (1302), from a first network device, a synchronization signal based on a control frame structure to a second network device including a digitally controlled surface having reflective elements. The method (1300) includes transmitting (1304) control information based on the control frame structure to a controller of the second network device. The control information is transmitted at least partly using a dedicated physical control channel, a sequence, and/or an on-off pattern.

20 Claims, 13 Drawing Sheets

(51) Int. Cl.
*H04B 7/06* (2006.01)
*H04L 5/00* (2006.01)

(58) Field of Classification Search
CPC ..... H04L 5/0044; H04L 5/0053; H04L 5/001; H04L 5/0023; H04L 5/0048
See application file for complete search history.

(56) References Cited

U.S. PATENT DOCUMENTS

2023/0032511 A1* 2/2023 Horn ................. H04W 72/20
2023/0043800 A1* 2/2023 Khojastepour .......... H04B 7/10

FOREIGN PATENT DOCUMENTS

| CN | 111917448 A | 11/2020 |
|---|---|---|
| CN | 112490679 A | 3/2021 |

OTHER PUBLICATIONS

"Towards Smart Wireless Communications via Intelligent Reflecting Surfaces: A Contemporary Survey", Gong et al, IEEE, May 19, 2020 (Year: 2020).*
3GPP, "3rd Generation Partnership Project; Technical Specification Group Radio Access Network; UTRAN Iuant Interface: Application Part (Release 16)", 3GPP TS 25.466 V16.0.0, Jul. 2020, pp. 1-8.
3GPP, "3rd Generation Partnership Project; Technical Specification Group Radio Access Network; UTRAN Iuant Interface: General aspects and principles (Release 16)", 3GPP TS 25.460 V16.0.0, Jul. 2020, pp. 1-7.
3GPP, "3rd Generation Partnership Project; Technical Specification Group Radio Access Network; UTRAN Iuant Interface: Layer 1 (Release 16)", 3GPP TS 25.461 V16.0.0, Jul. 2020, pp. 1-8.
3GPP, "3rd Generation Partnership Project; Technical Specification Group Radio Access Network; UTRAN Iuant Interface: Signalling transport (Release 16)", 3GPP TS 25.462 V16.0.0, Jul. 2020, pp. 1-7.
3GPP, "3rd Generation Partnership Project; Technical Specification Group Radio Access Network; UTRAN overall description (Release 16)", 3GPP TS 25.401 V16.0.0, Jul. 2020, pp. 1-64.
Minchae Jung, "On the Optimality of Reconfigurable Intelligent Surfaces (RISs): Passive Beamforming, Modulation, and Resource Allocation", Feb. 4, 2021, pp. 1-33.
PCT/IB2022/056909, "Notification of Transmittal of the International Search Report and the Written Opinion of the International Searching Authority, or the Declaration", International Searching Authority, dated Nov. 7, 2022, pp. 1-15.
Arfaoui et al., "Integration of IRS in Indoor VLC Systems: Challenges, Potential and Promising Solutions", arXiv:2101.05927v1 [eess.SP], Jan. 15, 2021, pp. 1-7.
Yue et al., "Practical RIS-Aided Coded Systems: Joint Precoding and Passive Beamforming", IEEE Wireless Communications Letters, vol. 10, No. 11, Nov. 2021, pp. 1-6.
Guo et al., "Reflecting Modulation", arXiv:1912.08428v2 [eess.SP], May 14, 2020, pp. 1-14.
China Unicom, "Email discussion summary for [RAN-R18-WS-crossFunc-China_Unicom]", 3GPP TSG RAN Rel-18 workshop RWS-210613, Jun. 28-Jul. 2, 2021, pp. 1-15.
Direnzo et al., "Smart Radio Environments Empowered by Reconfigurable Intelligent Surfaces: How it Works, State of Research, and Road Ahead", arXiv:2004.09352v1 [cs.IT], Apr. 20, 2020, pp. 1-74.
Gong et al., "Towards Smart Wireless Communications via Intelligent Reflecting Surfaces: A Contemporary Survey", arXiv:1912.07794v2 [cs.IT], May 19, 2020, pp. 1-31.
Gong et al., "Towards Smart Radio Environment for Wireless Communications via Intelligent Reflecting Surfaces: A Comprehensive Survey", arXiv:1912.07794v1 [cs.IT], Dec. 17, 2019, pp. 1-32.
Dardari et al., "Using MetaPrisms for Performance Improvement in Wireless Communications", arXiv:2003.13505v1 [eess.SP], Mar. 30, 2020, pp. 1-30.

* cited by examiner

CONTROL INFORMATION FOR A DIGITALLY CONTROLLED SURFACE HAVING REFLECTIVE ELEMENTS

FIELD

The subject matter disclosed herein relates generally to wireless communications and more particularly relates to control information for a digitally controlled surface having reflective elements.

BACKGROUND

In certain wireless communications networks, data transmissions may lack sufficient transmission power and/or transmission direction. Such data transmissions may use a digitally controlled surface to enhance their power and/or modify their transmission direction.

BRIEF SUMMARY

Methods for control information for a digitally controlled surface having reflective elements are disclosed. Apparatuses and systems also perform the functions of the methods. One embodiment of a method includes transmitting, from a first network device, a synchronization signal based on a control frame structure to a second network device including a digitally controlled surface having reflective elements. In some embodiments, the method includes transmitting control information based on the control frame structure to a controller of the second network device. The control information is transmitted at least partly using a dedicated physical control channel, a sequence, and/or an on-off pattern.

One apparatus for control information for a digitally controlled surface having reflective elements includes a first network device. In some embodiments, the apparatus includes a transmitter that: transmits a synchronization signal based on a control frame structure to a second network device comprising a digitally controlled surface having reflective elements; and transmits control information based on the control frame structure to a controller of the second network device. The control information is transmitted at least partly using a dedicated physical control channel, a sequence, and/or an on-off pattern.

Another embodiment of a method for control information for a digitally controlled surface having reflective elements includes receiving a synchronization signal based on a control frame structure at a second network device comprising a digitally controlled surface having reflective elements. In some embodiments, the method includes receiving control information based on the control frame structure at a controller of the second network device. The control information is received at least partly using a dedicated physical control channel, a sequence, and/or an on-off pattern.

Another apparatus for control information for a digitally controlled surface having reflective elements includes a second network device including a digitally controlled surface having reflective elements. In some embodiments, the apparatus includes a receiver that: receives a synchronization signal based on a control frame structure; and receives control information based on the control frame structure at a controller of the second network device. The control information is received at least partly using a dedicated physical control channel, a sequence, and/or an on-off pattern.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
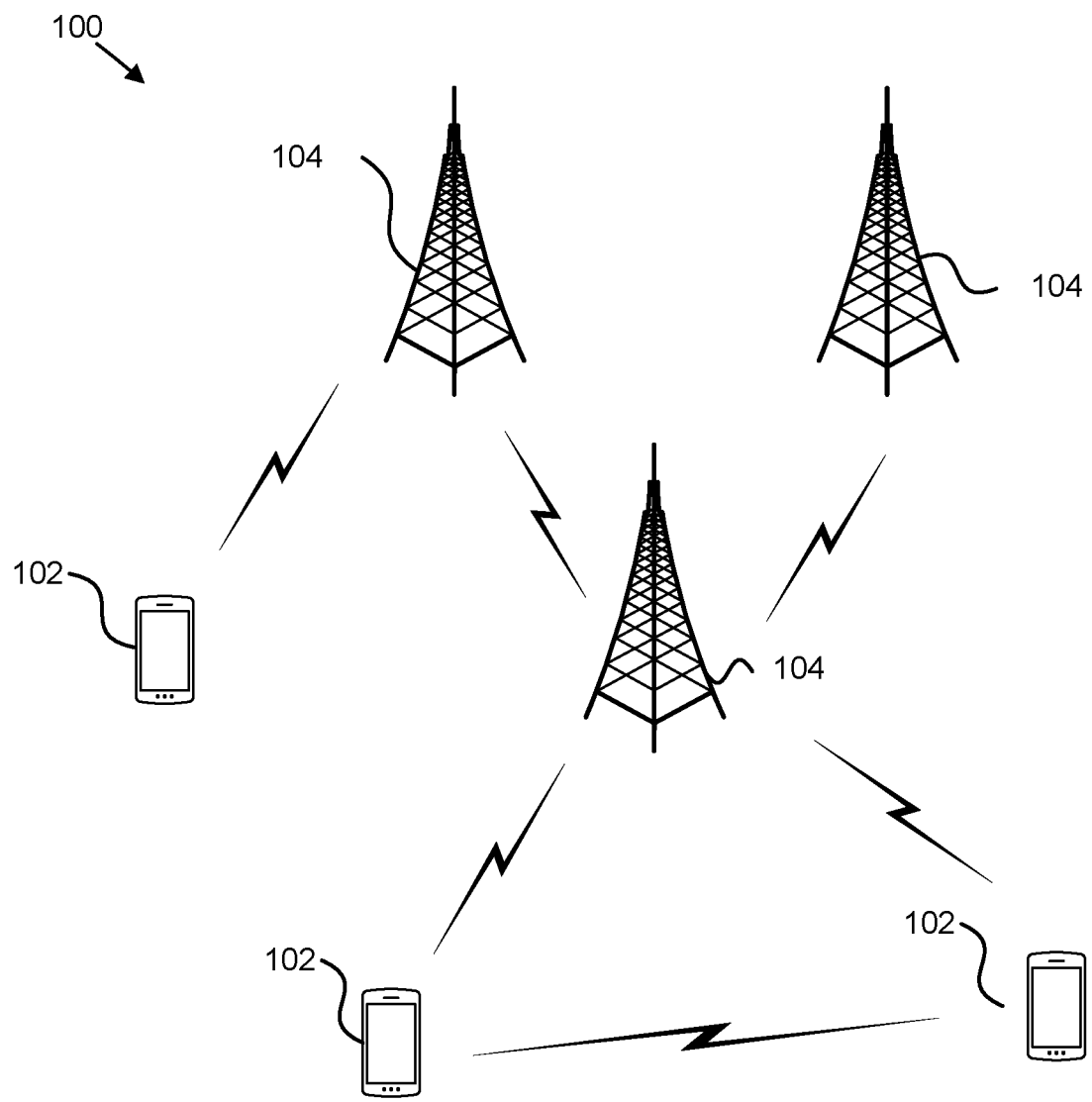
FIG. 1 is a schematic block diagram illustrating one embodiment of a wireless communication system for control information for a digitally controlled surface having reflective elements.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for control information for a digitally controlled surface having reflective elements. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), an RIS, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may transmit, from a first network device, a synchronization signal based on a control frame structure to a second network device including a digitally controlled surface having reflective elements. In some embodiments, the network unit 104 may transmit control information based on the control frame structure to a controller of the second network device. The control information is transmitted at least partly using a dedicated physical control channel, a sequence, and/or an on-off pattern. Accordingly, the network unit 104 may be used for control information for a digitally controlled surface having reflective elements.

In certain embodiments, a network unit 104 may receive a synchronization signal based on a control frame structure at a second network device comprising a digitally controlled surface having reflective elements. In some embodiments, the network unit 104 may receive control information based on the control frame structure at a controller of the second network device. The control information is received at least partly using a dedicated physical control channel, a sequence, and/or an on-off pattern. Accordingly, the network unit 104 may be used for control information for a digitally controlled surface having reflective elements.

Figure 2:
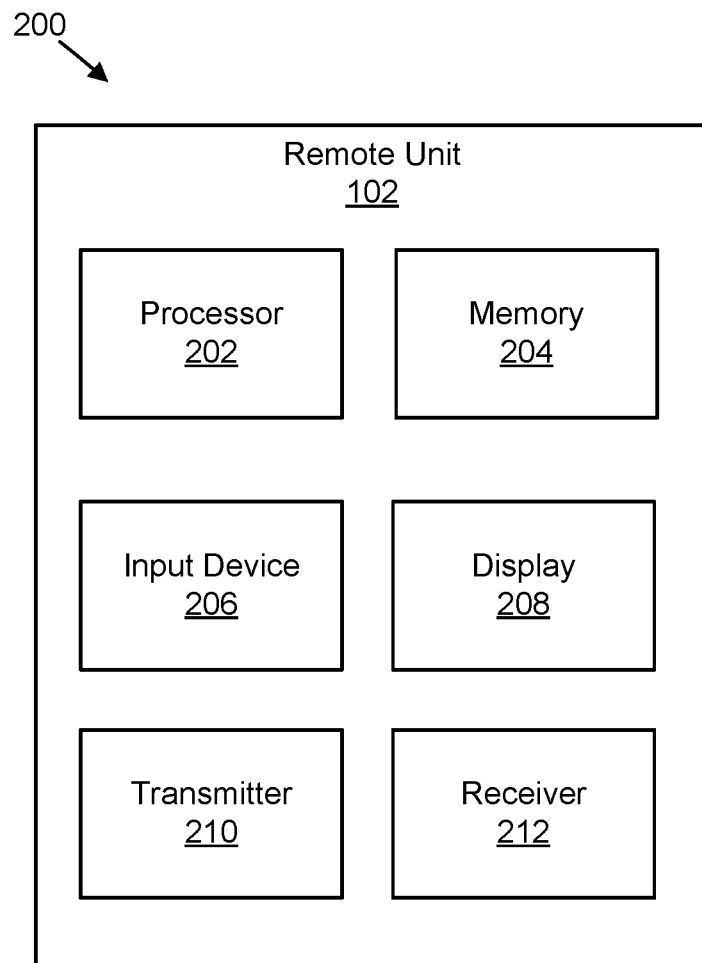
FIG. 2 is a schematic block diagram illustrating one embodiment of an apparatus that may be used for control information for a digitally controlled surface having reflective elements.

FIG. 2 depicts one embodiment of an apparatus 200 that may be used for control information for a digitally controlled surface having reflective elements. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
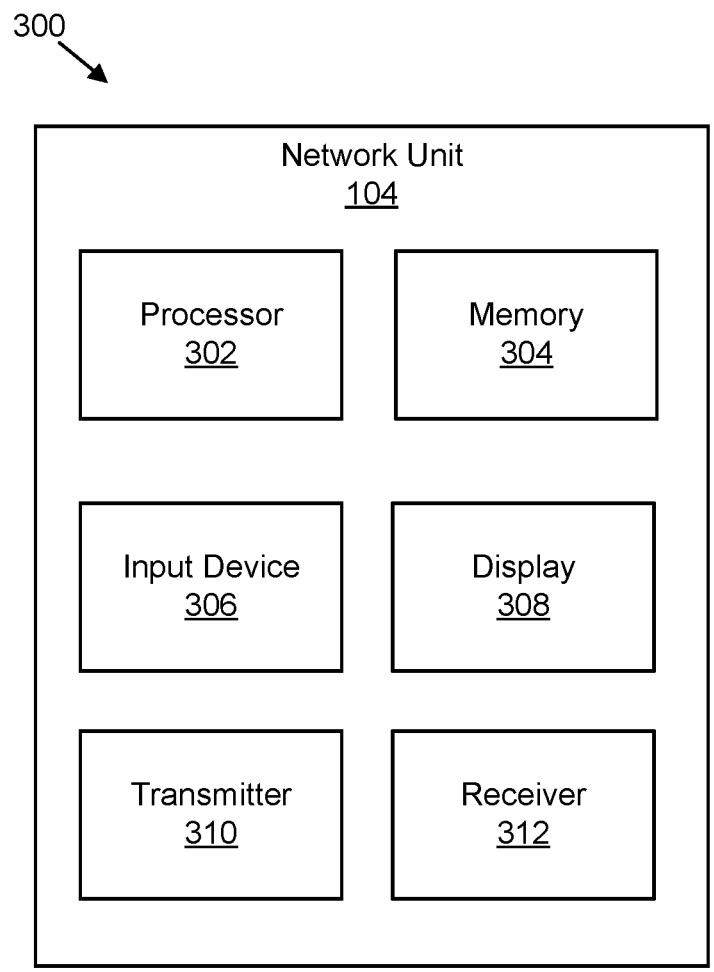
FIG. 3 is a schematic block diagram illustrating one embodiment of an apparatus that may be used for control information for a digitally controlled surface having reflective elements.

FIG. 3 depicts one embodiment of an apparatus 300 that may be used for control information for a digitally controlled surface having reflective elements. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits a synchronization signal based on a control frame structure to a second network device comprising a digitally controlled surface having reflective elements; and transmits control information based on the control frame structure to a controller of the second network device. The control information is transmitted at least partly using a dedicated physical control channel, a sequence, and/or an on-off pattern.

In some embodiments, the receiver 312: receives a synchronization signal based on a control frame structure; and receives control information based on the control frame structure at a controller of the second network device. The control information is received at least partly using a dedicated physical control channel, a sequence, and/or an on-off pattern.

In certain embodiments, reconfigurable intelligent surfaces ("RIS") may be used to enhance the coverage and capacity of a gNB and/or a transition and reception point ("TRP"). In some embodiments, a hardware design, optimization algorithms, channel modeling of an RIS, and an interface between the gNB and the RIS to control a phase and an amplitude of RIS elements (e.g., for a preferred propagation) may take into account a high number of the controllable RIS elements and a wide range of phase quantization (e.g., 0-2 pi). In various embodiments, an interface between a gNB and/or a TRP and an RIS may be an interface similar an the Iuant interface designed for controlling a tilt of remote electrical tilt ("RET") antennas which are based on cable communication with a three-layer protocol (e.g., application, datalink, and physical layers). In certain embodiments, to have a fast reconfigurability of a RIS and to use wireless communication, a lower layer control interface (e.g., physical ("PHY") and/or medium access control ("MAC") layer) may provide instantaneous wireless control based on channel characteristics and beamforming requirements. In some embodiments, there may be an air interface for signaling control information between a gNB and a RIS.

In various embodiments, RISs, also known as intelligent reflecting surfaces ("IRSs") or large intelligent surfaces ("LISs"), have a potential to enhance capacity and coverage of wireless networks by intelligently reconfiguring a propagation environment by adjusting a phase and an amplitude of the RIS elements. In certain embodiments, RIS technology does not use digital-to-analog converters and does not use power amplifiers, and thus meets certain green communications requirements. In some embodiments, RISs are made of a large number of low-cost and passive elements that can modify radio waves impinging upon them and may be coated on existing infrastructures. In various embodiments, RISs may have a large impact on wireless systems, especially if integrated with other emerging and advanced technologies such as Terahertz communication, massive multiple input multiple output ("MIMO"), artificial intelligence ("AI") and/or machine learning ("ML") based systems, and so forth and may be used for different applications such as communication, sensing, positioning, and so forth. In certain embodiments, to control phases and amplitudes of RIS elements, an interface to a network may be used to adapt reflection characteristics of the RIS based on channel conditions and transmission needs.

In some embodiments, a gNB may be used to signal RIS control information, such as: 1) transmitting a configuration and/or indication for an RIS specific synchronization signal for enabling time synchronization at a RIS controller receiver with a frame and/or slot timing for downlink ("DL") and/or uplink ("UL"); 2) transmitting a configuration and/or indication for an RIS control channel that carries control information to a RIS controller; 3) transmitting a configuration and/or indication for RIS specific sequences that indicate different RIS control information; and/or 4) applying an on pattern and/or an off pattern with an on mask and/or off mask for some DL symbols, where the pattern represents a RIS control payload.

Figure 4:
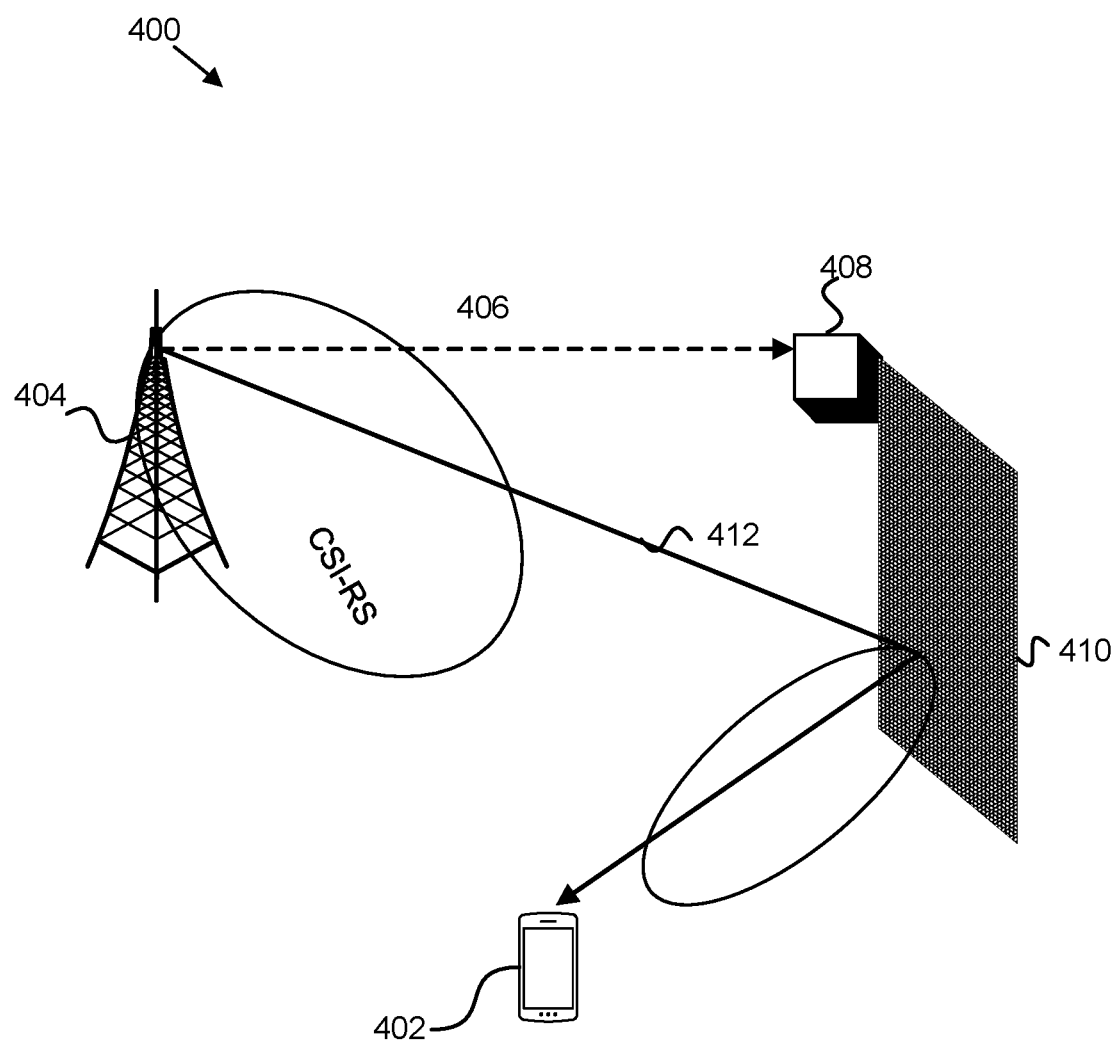
FIG. 4 is a schematic block diagram illustrating one embodiment of a system having a network node to RIS control air interface.

FIG. 4 is a schematic block diagram illustrating one embodiment of a system 400 having a network node to RIS control air interface. The system 400 includes a user equipment ("UE") 402 and a TRP 404. The TRP 404 transmits RIS control information 406 over a gNB-RIS interface to a RIS controller 408 of a RIS 410. The RIS control information 406 is used to control elements of the RIS 410. The elements of the RIS 410 are used to modify reflection characteristics of signals 412 transmitted toward the elements of the RIS 410.

It should be noted that embodiments herein may refer to controlling an RIS, but similar embodiments may be applied to other technologies such as smart repeaters.

In a first embodiment, there may be a network node-RIS air interface and control signaling. In the first embodiment, a network node transmits control information to an RIS controller that carries a control payload used for different configurations of the RIS. The RIS control information may be transmitted and/or received on physical channels (e.g., with a RIS-specific channel such as a physical RIS control channel ("PRCC")). It should be noted that different channel terminology for RIS control information transmission and/or reception may be used interchangeably herein. In the first embodiment, the RIS controller may be equipped with a low complexity receiver to synchronize to the network node and to decode the control information. In one implementation of the first embodiment, a low complexity receiver implies a reduced bandwidth, reduced transmit ("TX") and/or receive ("RX") antennas, relaxed processing timings, and so forth.

Figure 5:
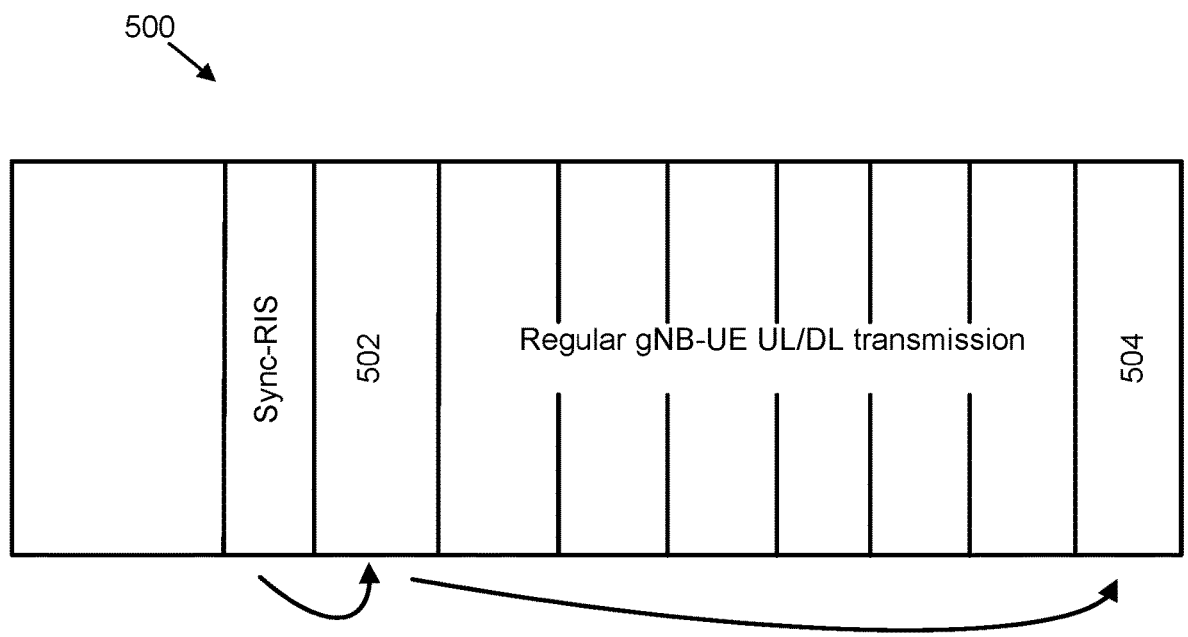
FIG. 5 is a schematic block diagram illustrating one embodiment of communications including an RIS control channel.

In the first embodiment, the RIS control channel may be transmitted on the same frequency (e.g., in-band communication) used for the network node-UE communication where a timing, periodicity, and frequency resource of an RIS control frame may be configured (e.g., periodic, aperiodic, and/or semi-persistent) or pre-configured (e.g., predefined). For time synchronization with the network node, one or more synchronization symbols may be located prior to the RIS control channel in a RIS control frame structure. This is important for the RIS to identify a start timing of the RIS control channel and/or frame. A reference signal for estimating a channel at the RIS controller may be located in pre-defined resources. After time synchronization to the network node, the RIS controller may start estimating and/or equalizing the RIS control channel using the RIS specific reference signal, then may apply decoding of the RIS control payload to be sent to a logic circuit for controlling hardware that is responsible for adjusting phase shifters (e.g., by applying a required biasing voltage to different positive-intrinsic-negative ("PIN") and/or variable capacitance ("Var") diodes connected to each element of the RIS. The RIS control can be divided into two steps. The initial RIS control channel may be located after the RIS synchronization signal which may contain control information or may contain indices of a location (e.g., slots and/or symbols) of the RIS control channel as shown in FIG. 5. The second part of the RIS control channel that carries actual control information may be located in defined slots with a pre-defined periodicity.

In various configurations of the first embodiment, the control frame structure of the RIS control channel may be implemented using the following: 1) a centralized unit ("CU") to a distributed unit ("DU") interface, an integrated access and backhaul ("IAB") parent-child interface, or a gNB donor-IAB interface; and/or 2) a RIS controller acting as a UE.

In certain embodiments of the first embodiment, if multiple RISs are used for a single network node, an RIS control signal and/or cyclic redundancy check ("CRC") of a control payload may be scrambled with an RIS identifier ("ID"). The RIS synchronization signal may be generated based on a cyclic shift associated with the RIS ID.

In some embodiments of the first embodiment, if the RIS is used for multiple cells, RIS may be pre-configured with cell IDs of the cells that use the same RIS for their transmission. The RIS synchronization signals and the RIS control information may be generated based on or scrambled with the cell ID. The RIS applies a cell search based on detecting the RIS synchronization signal and applies descrambling of RIS control information based on the detected cell ID.

FIG. 5 is a schematic block diagram illustrating one embodiment of communications 500 including an RIS control channel. The communications 500 include a synchronization RIS ("Sync-RIS") signal followed by an initial RIS control channel 502, and an RIS control channel 504. The initial RIS control channel 502 is separated from the RIS control channel 504 by regular gNB-UE UL and/or DL transmissions.

In various embodiments, there may be a signaling phase shift matrix indicator ("PSMI"). In such embodiments, a network node transmits control information in the RIS control channel. A bit field with multiple bits in a control payload indicates an index to a pre-defined phase shift matrix stored and/or pre-known to an RIS controller.

Figure 6:
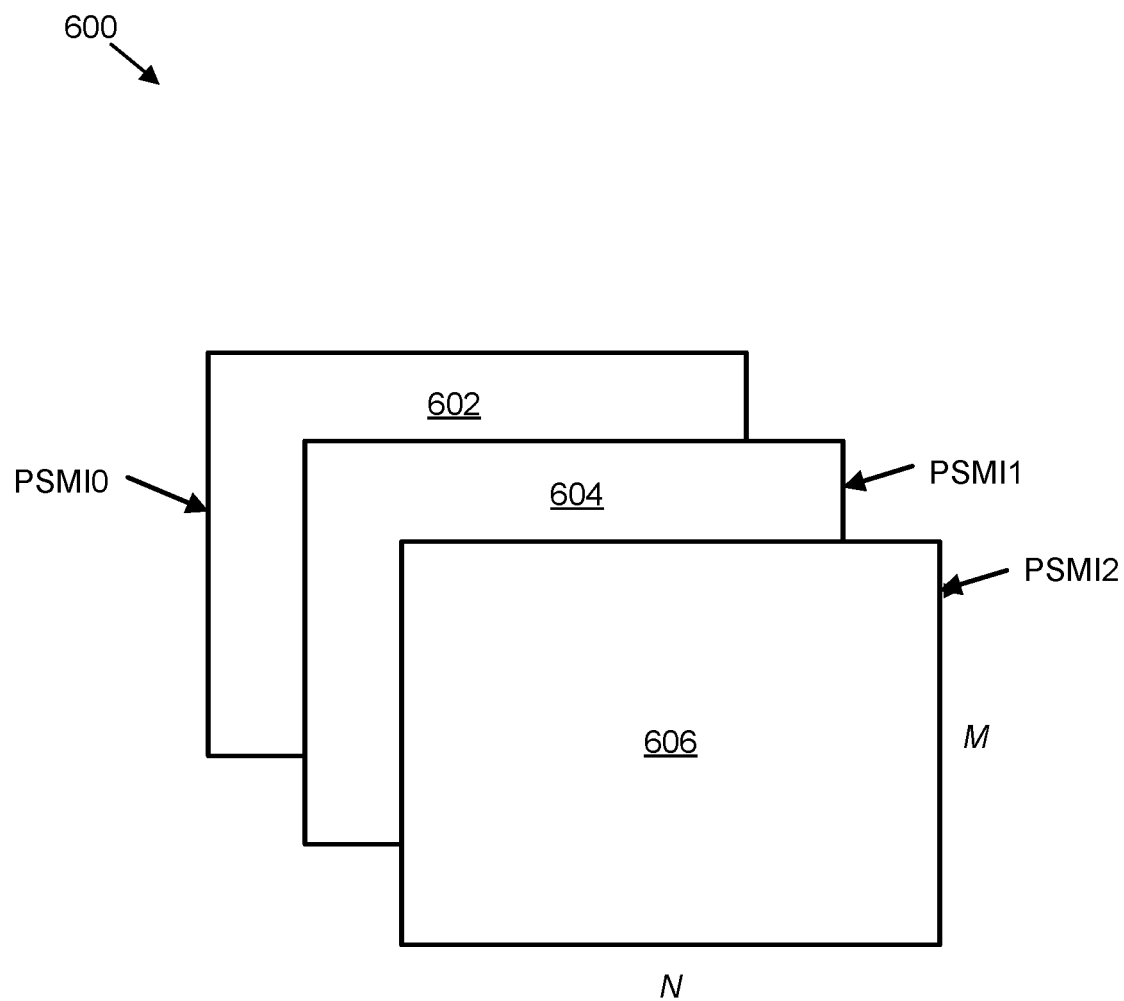
FIG. 6 is a schematic block diagram illustrating one embodiment of different PSMIs indicated to a RIS controller.

To allow different reflection characteristics of the RIS, each element of the RIS may be triggered with a specific phase shift. For fully dynamic 3D configuration of the RIS reflection, a full matrix (M*N), where M*N is the size of the surface in terms of the number of elements, and phase shifts value for each element (e.g., ranging between 0-2 pi) may be sent to the RIS. The full matrix requires a very large payload size, which may not be practical to be sent on an air control interface. Instead of sending the phase shifts of the whole matrix elements, the states of the RIS elements for reflections and/or beamforming to different space directions may be sent as an index (e.g., PSMI) to pre-defined phase shift matrixes. The RIS control channel carries the index to a phase shift matrix that is suitable for a certain reflection and/or beamforming characteristic of the RIS as shown in FIG. 6. For example, a 10 bit PSMI filed in the RIS control channel may indicate up to 1024 different phase shift matrixes. The number of elements and the dimensions of the RIS may be pre-known to the network and be reconfigurable in terms of the number of PSMI states and the corresponding PSMI bit field may be inserted accordingly.

FIG. 6 is a schematic block diagram 600 illustrating one embodiment of different PSMIs indicated to a RIS controller. There may be a first PSMI 602 (PSMI0), a second PSMI 604 (PSMI1), and a third PSMI 606 (PSMI2). Each PSMI may indicate a matrix of M by N elements. One example of an indicated matrix by PSMI may be:

$$\begin{pmatrix} 0 & pi/3 & 0 & pi/3 \\ pi/3 & 0 & pi/4 & 5pi/4 \\ 0 & pi/3 & pi & 0 \\ 3pi/2 & pi/2 & 0 & pi/2 \\ pi & pi/5 & pi & pi \\ pi & 0 & pi/4 & 0 \end{pmatrix}$$

In certain embodiments, based on a required link quality and interference avoidance, a network node may switch off an RIS. In some embodiments, a one-bit field may be included in an RIS control payload, where 0 corresponds to switching a reflection off and 1 corresponds to switching the RIS on (e.g., hence indicating to the RIS controller to look at the PSMI field). In various embodiments, one PSMI index is associated with switching the RIS off. If the RIS controller receives this specific PSMI index, the RIS controller switches the whole RIS surface off.

In some embodiments, only a subset of configured PSMIs and/or preconfigured PSMIs are activated and a network node may then indicate a PSMI index within the subset with a smaller size bitmap. In various embodiments, two bitfields may be used, where one bitfield indicates which subset is used and the second bitfield indicates the PSMI index within that set. Within each set, local PSMI indexing may be applied.

In certain embodiments, a quasi-co-location assumption may be applied to a RIS for applying phase shifters for reflecting with beams and/or channels that may be quasi-co-located ("QCL") with previous transmissions. In some embodiments, a network node communicates with a device using either just a RIS (e.g., no direct link) or using both an RIS and direct links at time t, then the network node may indicate to the RIS to apply same phase shifter configuration (e.g., without explicitly indicating) at a later time t1 for communicating with the device. A QCL assumption may be indicated either in relation to a time offset between past and future communications or by another way (e.g., indexing). In various embodiments, an index to spatial filter coefficients for an RIS may be sent in a control channel.

Figure 7:
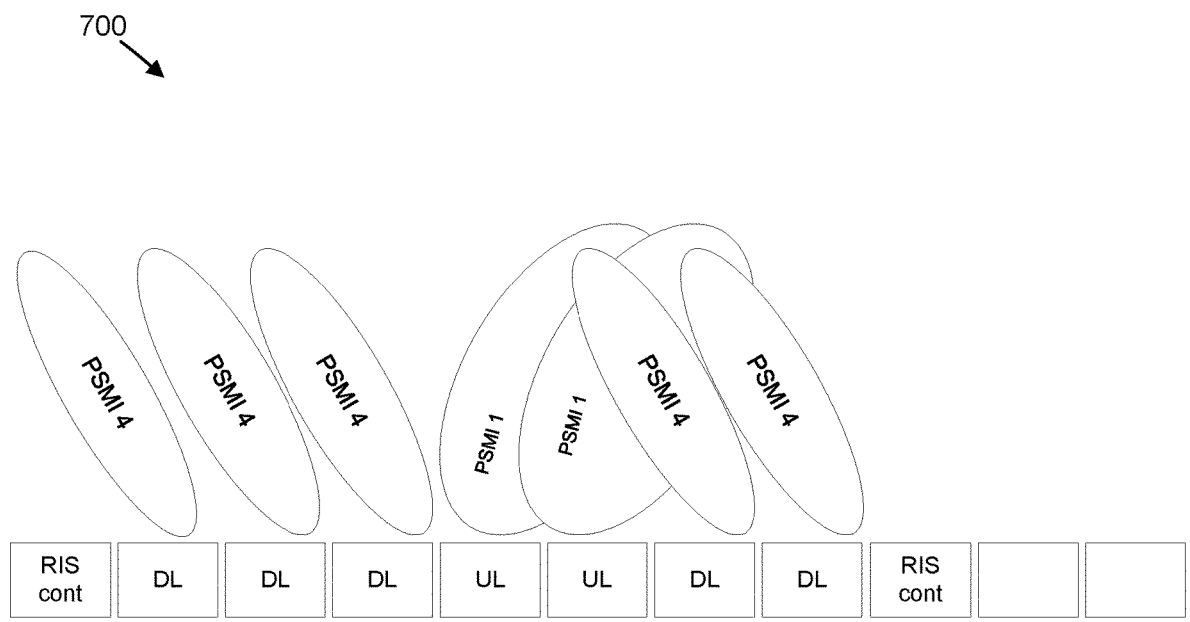
FIG. 7 is a schematic block diagram illustrating one embodiment of indicating multiple PSMI and SFI for UL and/or DL.

In some embodiment, multiple PSMIs (e.g., for UL and DL) may be indicated. In such embodiments, a network node transmits multiple PSMIs in an RIS control channel. Each PSMI indicates a phase shift matrix to be applied either for UL or DL. Since the phase shifts states of the surfaces are different for UL and DL, at least two PSMI indexes may be indicated to the RIS controller following a time domain duplexing ("TDD") switching. In one implementation of such embodiments, the RIS controller receives both PSMI indexes in the RIS control channel and applies a DL PSMI to the next DL slot and an UL PSMI to the next UL slot. Symbol offsets for a next DL slot and a next UL slot may be included in an RIS control payload. In another implementation of such embodiments, a slot format indication ("SFI") or TDD switching points of a specific UE to serve may be included in an RIS control payload as shown in FIG. 7. In various implementations of such embodiments, a network node transmits a PSMI for DL and an offset to an UL PSMI. For example, 10 bits in a field may indicate the DL PSMI and a lower number of bits may be used to indicate an UL PSMI as an offset from the DL PSMI so that an overhead of the RIS control payload may be reduced. The RIS controller, upon decoding this specific field in the RIS control payload, may apply an associated PSMI for DL slots and/or UL slots to avoid sending an RIS control channel in every slot. The applicability of these PSMIs may be based on whether an SFI is valid until a new RIS control channel is received. In various embodiments, a grouping table of PSMI may be applied, where each index of the table indicates multiple PSMIs for indication to the RIS. In such embodiments, a smaller number of bits may be used to indicate multiple PSMIs to the RIS.

FIG. 7 is a schematic block diagram 700 illustrating one embodiment of indicating multiple PSMI and SFI for UL and/or DL. As illustrated an RIS control channel (e.g., RIS control payload) may indicate PSMI 1 for UL and PSMI 4 for DL.

Figure 8:
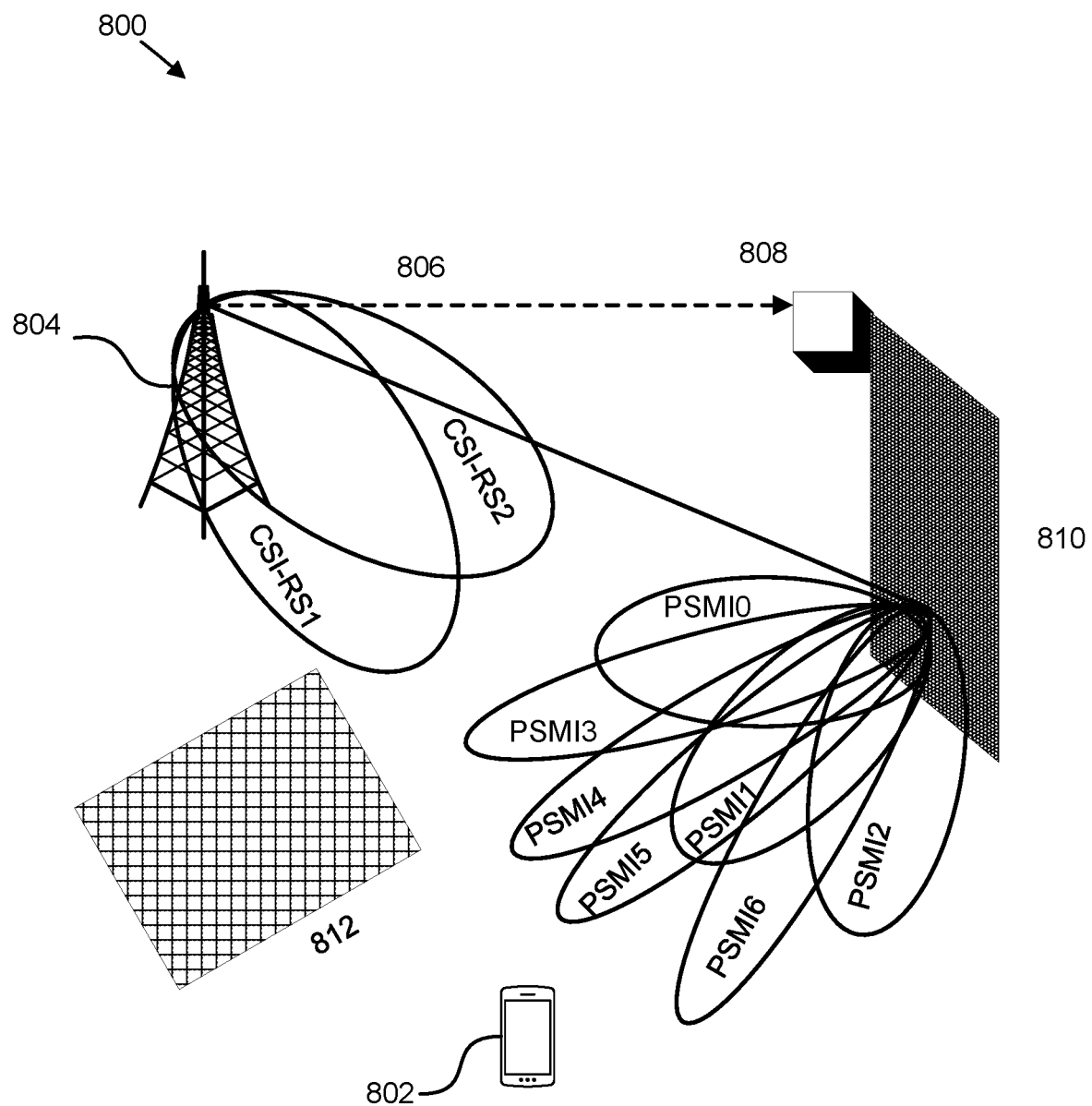
FIG. 8 is a schematic block diagram illustrating one embodiment of a system for beam sweeping of a reflected signal using PSMI.

In certain embodiments, there may be a PSMI periodicity and RIS beam sweeping indication. In such embodiments, a network node transmits, besides a PSMI and SFI, other fields in an RIS control payload that indicate beam sweeping of beamformed reflections from the RIS as shown in FIG. 8. The beam sweeping may be used by the network node to calibrate and to identify suitable PSMI that provide the highest signal to noise ratio ("SNR") at the UE side. In such embodiments, the UE measures the RSRP or the SNR of the combined received DL signal from both the network node and the RIS and reports the measurement in a channel state information ("CSI") report associated with each slot index for which a certain PSMI is applied. The CSI signal to interference and noise ratio ("SINR") ("CSI-SINR") and/or reference signal received power ("RSRP") along with a slot number gives an implicit indication of an effect of the different PSMIs used for the reflected beam sweeping. An indication may be provided to the RIS controller is indicated a PSMI to start with and another field to apply beam sweeping by selecting the suitable PSMI offset from the indicated PSMI for each slot, such that the beamformed reflection from the surface changes to cover different spatial direction based on applying the suitable PSMI for each time slot starting with the indicated PSMI and the indicated staring slot. The RIS is indicated with the number of slots (e.g., period) for which the sweeping is applied. In the example of FIG. 8, the RIS is indicated with PSMI 3 as a starting phase state and indicated with 4 contiguous slots to perform beam sweeping by applying the indexes PSMI3, PSMI4, PSMI5, and PSMI6. If the RIS is indicated with PSMI1 and with 2 slots for weeping, then it applies PSMI1 and PSMI2 for two contiguous slots.

FIG. 8 is a schematic block diagram illustrating one embodiment of a system 800 for beam sweeping of a reflected signal using PSMI. The system 800 includes a UE 802 and a TRP 804. The TRP 804 transmits RIS control information 806 over a gNB-RIS interface to a RIS controller 808 of an RIS 810. The RIS control information 806 is used to control elements of the RIS 810. The UE 802 receives beam sweeping of one or more of PSMI0, PSMI1, PSMI2, PSMI3, PSMI4, PSMI5, and/or PSMI6. Moreover, the UE 802 receives CSI reference signal ("RS") 1 ("CSI-RS1") and CSI RS 2 ("CSI-RS2") from the TRP 804. Blockage 812 may cause interference with any of the signals.

Figure 9:
FIG. 9 is a schematic block diagram illustrating one embodiment of RIS beam sweeping and PSMI applicability.

In various embodiments, an RIS controller may receive an indication with a number of the slots (e.g., time applicability) for each PSMI to be applied as illustrated in FIG. 9. Specifically, FIG. 9 is a schematic block diagram 900 illustrating one embodiment of RIS beam sweeping and PSMI applicability. In the embodiment of FIG. 9, the reflected beam sweeping started with the indicated PSMI n, and the applicability of each PSMI is 2 slots, then the index is incremented for each group of two slots. For such embodiment, the PSMIs in the RIS controller are ordered so that each PSMI performs one beam direction with a specific spatial offset from the previous index.

In certain embodiments, a PSMI indication is based on location mapping. In such embodiments, a network forms a database for a mapping of PSMI and UE locations. This database may be established based on offline training or adaptive learning. The network may share this database with an RIS controller. An index corresponding to the mapping of PSMI for a certain location is indicated to the RIS controller instead of indicating the PSMI. For instance, through physical RIS control channel ("PRCC"). Based on the index, the RIS controller selects a corresponding PSMI. To achieve a better accuracy of mapping of PSMI and UE locations, different methodologies may be implemented. For instance, the RIS coverage area may be divided into zones where a zone may be grouped into small grids (e.g., square or rectangular). Each grid may be associated with a grid ID. A mapping of RIS beams with grid IDs may be formed. To further enhance accuracy, additional parameters, such as UE antenna orientation, height, speed, and three dimensional ("3D") coordinates, may be considered for an association of a PSMI with a location.

Figure 10:
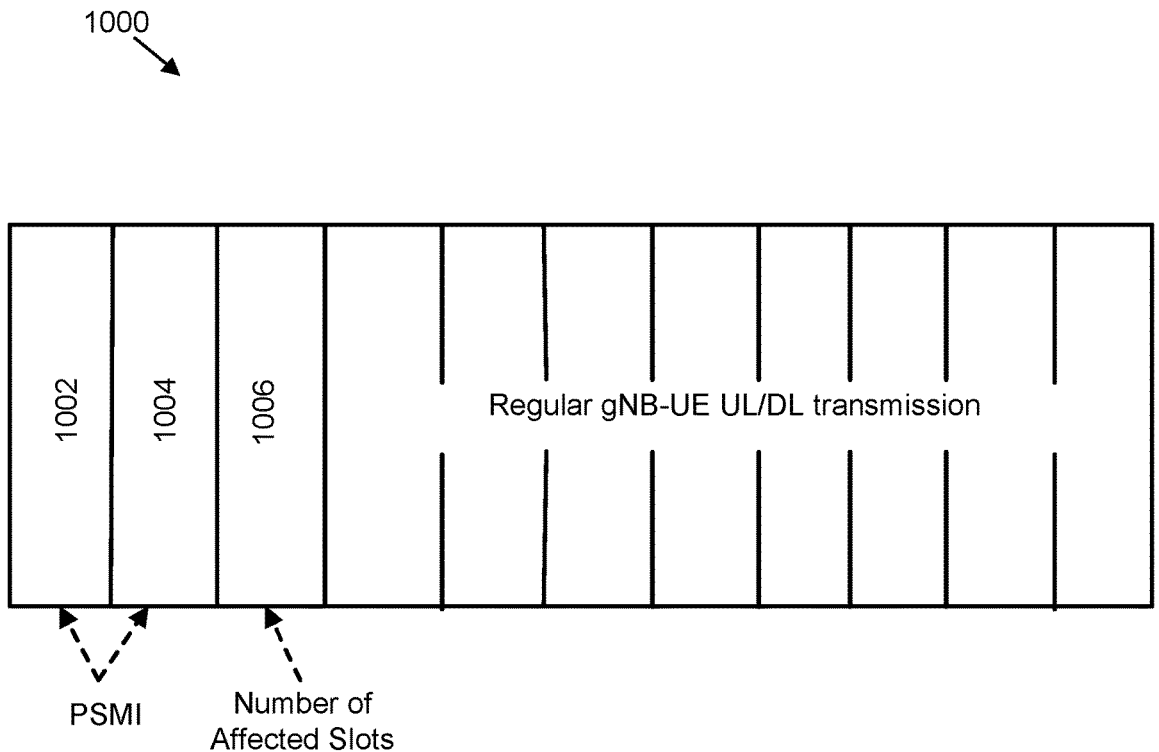
FIG. 10 is a schematic block diagram illustrating one embodiment of using ZC sequences to carry RIS control information.

In a second embodiment, an RIS control indication may be made using a sequence transmission. In such an embodiment, a network node transmits control information to an RIS controller that is equipped with a low complexity receiver to perform correlation of a pre-defined sequence, such as Zadoff-Chu ("ZC") sequence, transmitted by the network node. The sequence may be generated with cyclic shifts. Each sequence may correspond to few bits of the payload that carry RIS control information (e.g., PSMI) to indicate a suitable phase matrix for the RIS. The length of the RIS control information payload depends on the length of the sequence and the number of the orthogonal generated sequences. The network node may send multiple sequences in multiple symbols with each sequence carrying part of the RIS control information. In one implementation of the second embodiment, the RIS control payload is divided into multiple parts. Each part may be used to generate a corresponding sequence by cyclic shifting a base sequence based on a bit field of the part. The RIS controller applies a correlation search for each symbol to detect the bits and concatenates the results from the different symbols to retrieve the RIS control payload. In another implementation of the second embodiment, each symbol and/or sequence carries a specific bit field of the RIS control payload as depicted in the embodiment of FIG. 10. Specifically, FIG. 10 is a schematic block diagram 1000 illustrating one embodiment of using ZC sequences to carry RIS control information. A first RIS ZC sequence 1002 (RISZCSequence0), a second RIS ZC sequence 1004 (RISZCSequence1), and a third RIS ZC sequence 1006 (RISZCSequence2) are transmitted. PSMI may be sent using one or more sequences (e.g., the first RIS ZC sequence 1002 and the second RIS ZC sequence 1004) and a number of affected slots is sent in another sequence and/or symbol (e.g., the third RIS ZC sequence 1006), the SFI is sent in another sequence and/or symbol, and so forth.

Figure 11:
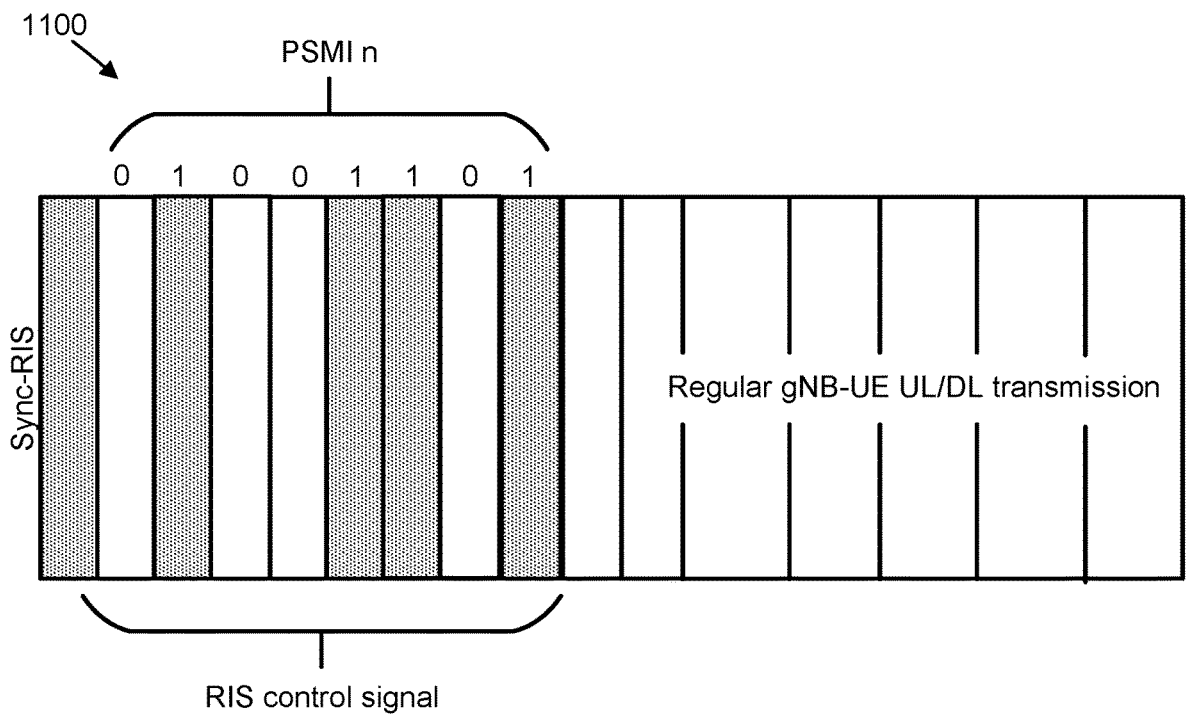
FIG. 11 is a schematic block diagram illustrating one embodiment of an on pattern and/or an off pattern of symbols for indicating RIS control information.

In a third embodiment, an RIS control indication is transmitted using an on pattern and/or off pattern and energy detection. In the third embodiment, a network node transmits RIS control information to an RIS controller that is equipped with a low complexity receiver to perform energy detection to retrieve the RIS control information. The network node sends on patterns and/or off patterns by switching off the transmission on some symbols and transmits signal in other symbols so that upon detecting the power of the received signal a pattern of 0 s and 1 s is retrieved that indicates RIS control information such as the PSMI. In one implementation of the third embodiment, a time domain OFDM symbol is masked with a bit pattern that carries specific RIS control information as illustrated in FIG. 11. Detection thresholds for distinguishing between 0 s and 1 s and a length of the pattern may be pre-configured via transmission to the RIS controller.

Specifically, FIG. 11 is a schematic block diagram 1100 illustrating one embodiment of an on pattern and/or an off pattern of symbols for indicating RIS control information. A PSMI n is indicated using an on pattern (e.g., shown by 1 s) and an off pattern (e.g., shown by 0 s) that follow a synchronization RS for RIS (Sync-RIS).

Figure 12:
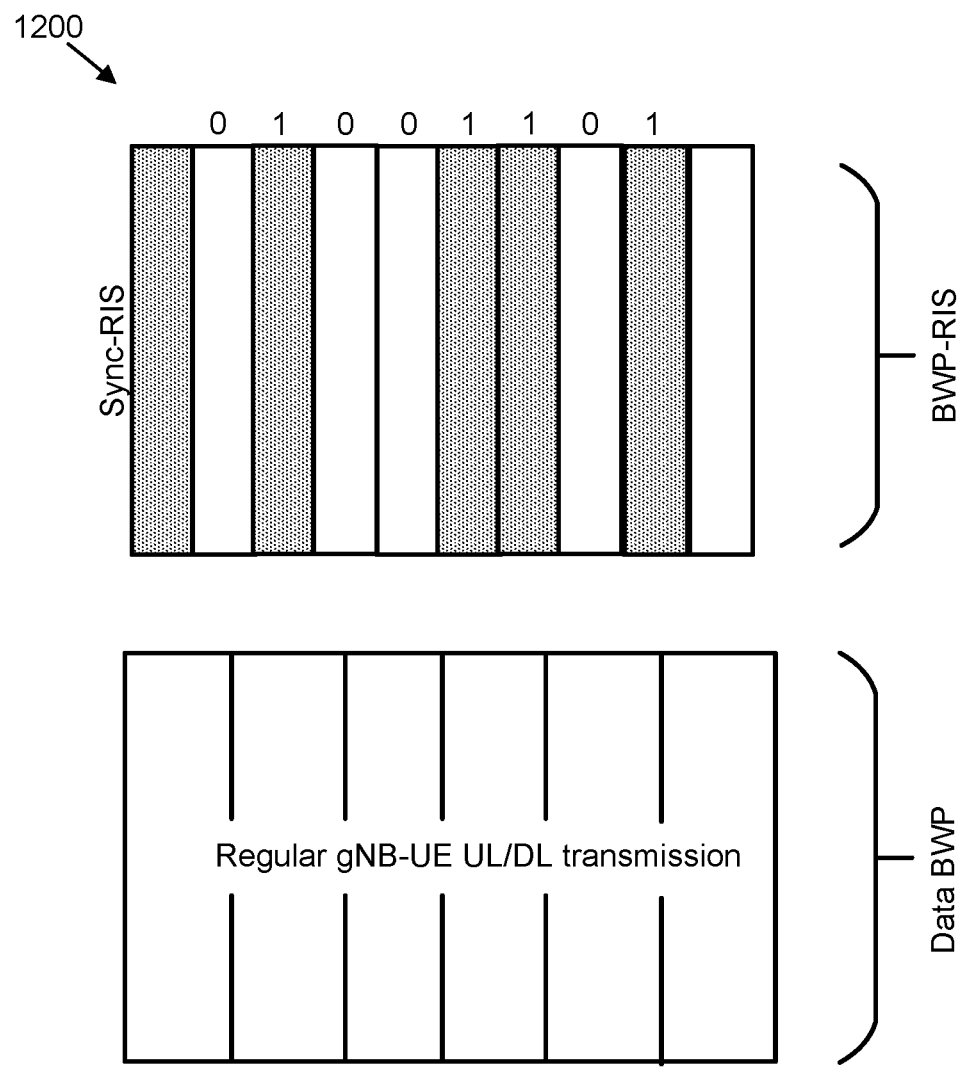
FIG. 12 is a schematic block diagram illustrating one embodiment of an on pattern and/or an off pattern of symbols for indicating RIS control information on an RIS specific BWP.

In certain embodiments, RIS control information is sent in a separate frequency band and/or bandwidth part ("BWP") or a carrier specific for transmitting the RIS control information to avoid in-band interference with a regular DL and/or UL transmission. In such embodiments, a narrow band (e.g., a few resource blocks ("RBs")) RIS BWP ("RIS-BWP") may be preconfigured by transmission to the RIS as shown in the embodiment of FIG. 12, or a specific out-of-band carrier may be used for transmitting the RIS control information. Specifically, FIG. 12 is a schematic block diagram 1200 illustrating one embodiment of an on pattern and/or an off pattern of symbols for indicating RIS control information on an RIS specific BWP (e.g., BWP-RIS) different from a data BWP. A PSMI n is indicated using an on pattern (e.g., shown by 1 s) and an off pattern (e.g., shown by 0 s) that follow a synchronization RS for RIS (Sync-RIS) on the BWP-RIS.

In some embodiments, a network node sends spatial information of a reflection in the form of an angle of signal departure and a beamwidth of a reflected signal. Instead of sending an index of a phase shift matrix, only information about an intended direction of the reflected signal and the beamwidth needed to reach a certain distance are sent. An RIS controller translates this information to suitable phase shifts of the elements to perform the reflection with the indicated angle of departure and with the indicated beamwidth. A number of bits required to signal this information may depend on how many spatial angles are needed to cover a certain area as well as the beamwidth of each reflected signal. For example, 4 bits may be sent to indicate 16 different directions with a certain beam beamwidth that is indicated with 2 bits (e.g., 4 different widths). If RIS supports narrow beam focusing or if an incoming signal is sent with a narrow beam, a number of bits needed for indicating an angle of departure may be large to cover all possible directions. While for wide beams, a few bits for indicating an angle of departure may be enough.

In various embodiments, to further reduce an overhead of control information, an offset to a previously indicated angle of departure and/or beamwidth may be indicated to an RIS controller. For example, the offset may be sent with 3 bits, where (000) indicates using the same previous angle alpha0 While (001 to 011) indicate to use one of the angles to the right of alpha0, (e.g., one of alpha1, alpha2, or alpha3), and (100 to 110) indicate to use one of the angles to the left of alpha0 (e.g., one of alpha-1, alpha-2, or alpha-3).

Figure 13:
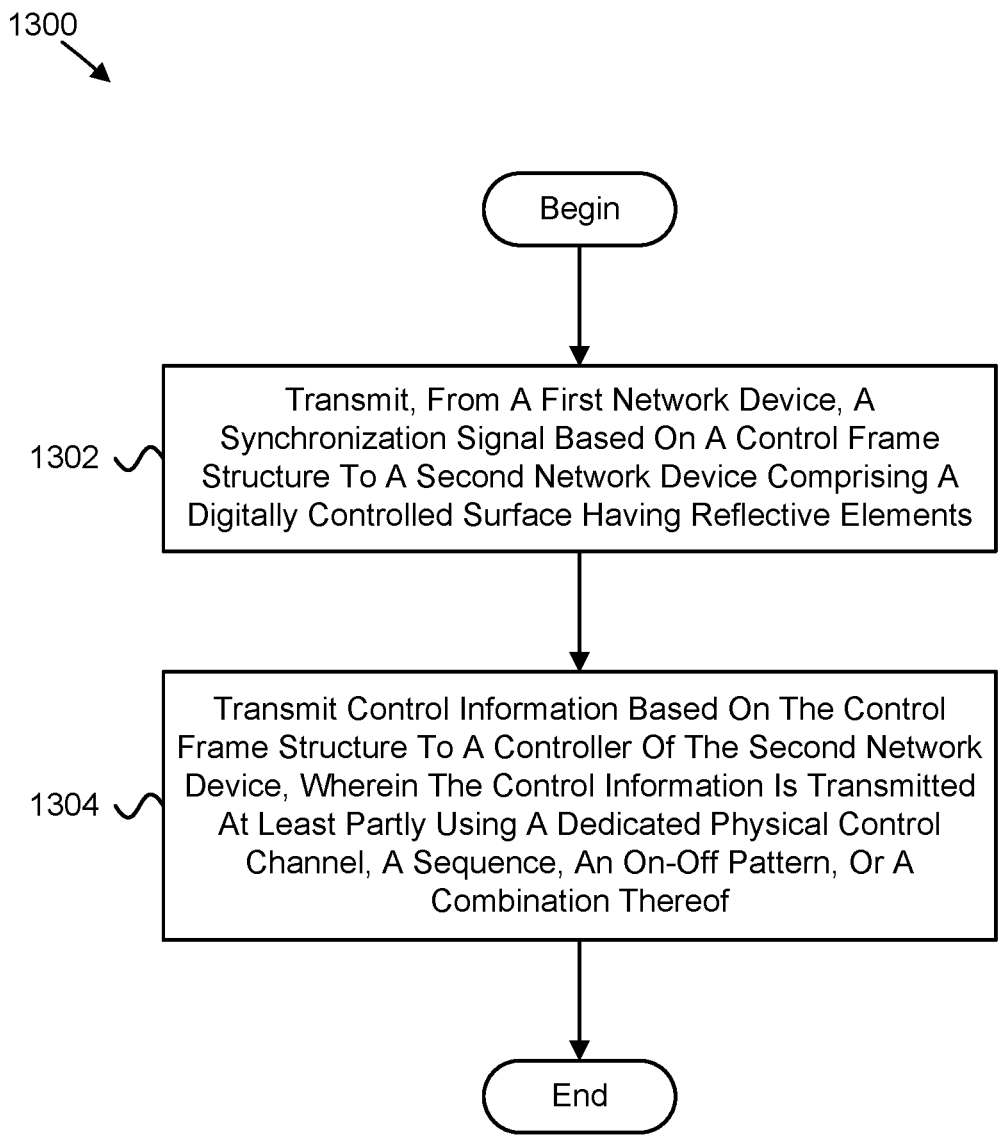
FIG. 13 is a flow chart diagram illustrating one embodiment of a method for control information for a digitally controlled surface having reflective elements.

FIG. 13 is a flow chart diagram illustrating one embodiment of a method 1300 for control information for a digitally controlled surface having reflective elements. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes transmitting 1302, from a first network device, a synchronization signal based on a control frame structure to a second network device including a digitally controlled surface having reflective elements. In some embodiments, the method 1300 includes transmitting 1304 control information based on the control frame structure to a controller of the second network device. The control information is transmitted at least partly using a dedicated physical control channel, a sequence, and/or an on-off pattern.

In certain embodiments, the synchronization symbol is sent prior to the control information for time synchronization between the first network device and the second network device. In some embodiments, the method 1300 further comprises transmitting the control frame structure to the second network device on predetermined resources, at a predetermined periodicity, or a combination thereof.

In various embodiments, the control information comprises a first transmission including at least one index corresponding to a location of a reconfigurable intelligent surface control channel, and a second transmission including a control payload located in predetermined slots with a predetermined periodicity. In one embodiment, in response to multiple reconfigurable intelligent surfaces being used for a single network node, a reconfigurable intelligent surface control signal, a cyclic redundancy check, or a combination thereof of a control payload of the control information is scrambled with a reconfigurable intelligent surface identifier, and the reconfigurable intelligent surface synchronization signal is generated based on a cyclic shift associated with a reconfigurable intelligent surface identifier.

In certain embodiments, in response to a reconfigurable intelligent surface being used for multiple cells, the reconfigurable intelligent surface is configured with cell identifiers of cells that use the reconfigurable intelligent surface for transmission, and reconfigurable intelligent surface synchronization signals and the control information are generated based on, scrambled, or a combination thereof with a cell identifier of the cell identifiers. In some embodiments, the control information is transmitted in a reconfigurable intelligent surface control channel, and a bit field having multiple bits in a control payload of the control information indicates an index corresponding to a predetermined phase shift matrix stored in the controller. In various embodiments, a control payload of the control information comprises a one-bit field, a 0 in the one-bit field indicates to switch a reflection off, and 1 in the one-bit field indicates to switch the reflection on.

In one embodiment, a slot format indication for uplink switching, downlink switching, or a combination thereof is included in a control payload of the control information to enable a phase shift matrix index for uplink, a phase shift matrix index for downlink, or a combination thereof. In certain embodiments, the control information comprises a downlink phase shift matrix index and an offset, and the offset applied to the downlink phase shift matrix index indicates an uplink phase shift matrix index. In some embodiments, the method 1300 further comprises transmitting a bit field in a control payload of the control information, wherein the bit field indicates beam sweeping of a beamformed reflection from a reconfigurable intelligent surface of the second network device.

In various embodiments, the method 1300 further comprises indicating, to the controller, a starting phase shift matrix index, and indicating whether to apply beam sweeping by selecting a suitable phase shift matrix index offset from a phase shift matrix index for each slot. In one embodiment, the method 1300 further comprises transmitting, to the controller, an indication of a number of slots for each phase shift matrix index of a plurality of phase shift matrix indexes to be applied. In certain embodiments, the method 1300 further comprises forming a database comprising mappings between phase shift matrix indexes and user equipment locations by dividing a reconfigurable intelligent surface coverage of the second network device into zones, and an index corresponding to the mapping of a phase shift matrix index for a certain location is indicated to the controller instead of indicating the phase shift matrix index.

In some embodiments, the control information is transmitted using predetermined sequences located in predetermined symbols and generated with predetermined cyclic shifts, and each sequence of the predetermined sequences corresponds to bits of the payload that carry the control information. In various embodiments, a reconfigurable intelligent surface control payload of the control information is divided into a plurality of parts, each part of the plurality of part is used to generate a corresponding sequence by cyclic shifting a base sequence based on a bit field of the part, the controller applies a correlation search for each symbol to detect bits, and the controller concatenates results from different symbols to retrieve the reconfigurable intelligent surface control payload. In one embodiment, each symbol of a control payload of the control information carries a specific bit field or sequence, a phase shift matrix index is sent using a first symbol, a number of affected slots is sent in a second symbol, and a slot format indication is sent in a third symbol.

In certain embodiments, transmitting the control information comprises using on-off patterns produced by switching off a transmission of some symbols and transmitting signals in other symbols so that a pattern of 0 s and 1 s is retrieved by the second network device, and the pattern indicates specific reconfigurable intelligent surface control information. In some embodiments, transmitting the control information comprises masking at least one symbol with an on-off pattern having a predetermined length to carry specific reconfigurable intelligent surface control information. In various embodiments, the control information is sent in a separate frequency band, in a separate bandwidth part, in a specific carrier, or some combination thereof to avoid in-band interference with another transmission.

In one embodiment, the control information comprises an angle of departure, an angle of reflection, or a combination thereof, and the controller uses the angle of departure, the angle of reflection, or the combination thereof to determine reflection coefficients, phase shifts, or a combination thereof for reflecting a signal. In certain embodiments, the control information comprises a beamwidth of a reflected signal, and the controller uses the beamwidth to determine reflection coefficients, phase shifts, or a combination thereof to apply to reconfigurable intelligent surface elements to focus a signal. In some embodiments, the control information comprises an offset to a previously indicated angle of departure and a previously indicated beamwidth.

Figure 14:
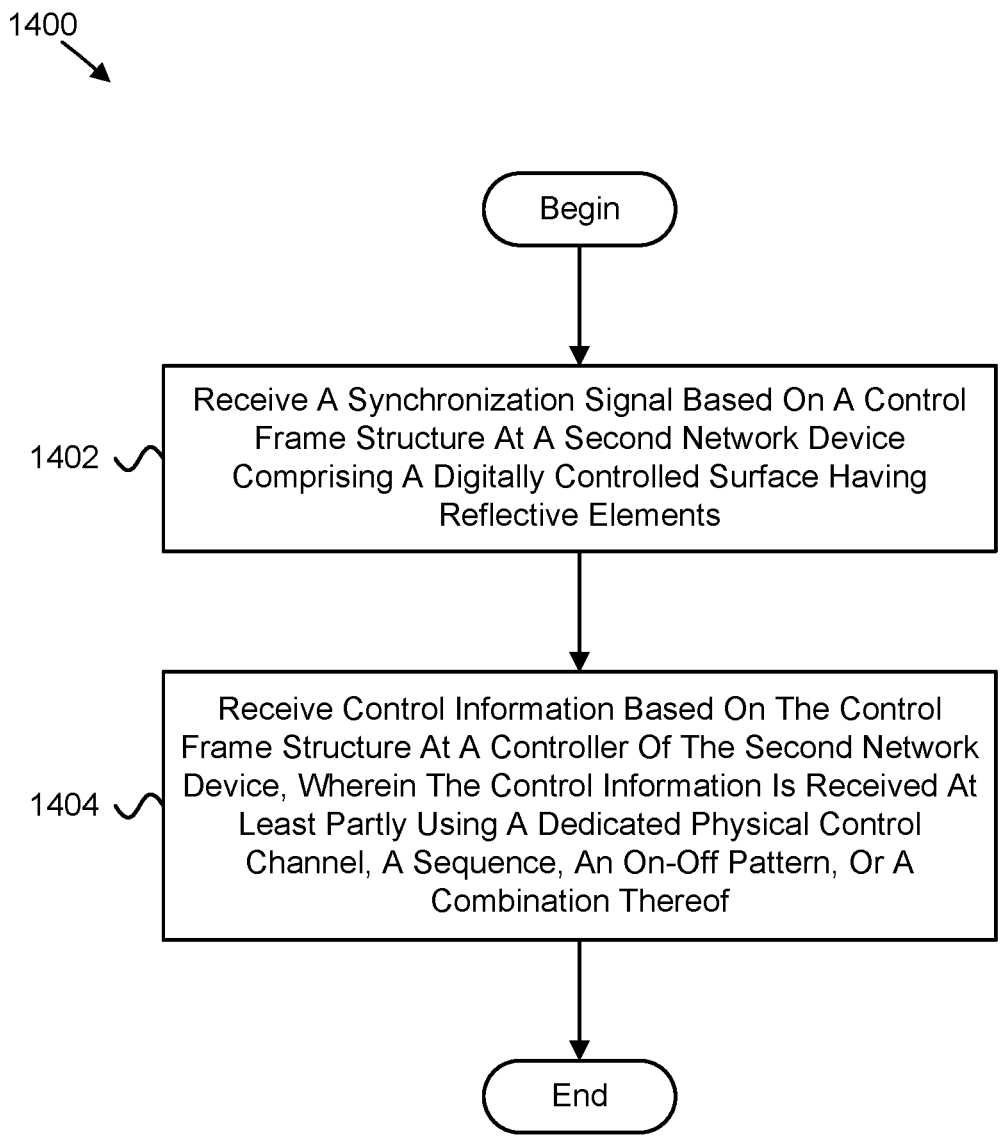
FIG. 14 is a flow chart diagram illustrating another embodiment of a method for control information for a digitally controlled surface having reflective elements.

FIG. 14 is a flow chart diagram illustrating one embodiment of a method 1400 for control information for a digitally controlled surface having reflective elements. In some embodiments, the method 1400 is performed by an apparatus, such as the network unit 104. In certain embodiments, the method 1400 may be performed by a processor executing program code, for example, a microcontroller, a microprocessor, a CPU, a GPU, an auxiliary processing unit, a FPGA, or the like.

In various embodiments, the method 1400 includes receiving 1402 a synchronization signal based on a control frame structure at a second network device comprising a digitally controlled surface having reflective elements. In some embodiments, the method 1400 includes receiving 1404 control information based on the control frame structure at a controller of the second network device. The control information is received at least partly using a dedicated physical control channel, a sequence, and/or an on-off pattern.

In certain embodiments, the synchronization symbol is sent prior to the control information for time synchronization between the first network device and the second network device. In some embodiments, the method 1400 further comprises receiving the control frame structure at the second network device on predetermined resources, at a predetermined periodicity, or a combination thereof.

In various embodiments, the control information comprises a first transmission including at least one index corresponding to a location of a reconfigurable intelligent surface control channel, and a second transmission including a control payload located in predetermined slots with a predetermined periodicity. In one embodiment, in response to multiple reconfigurable intelligent surfaces being used for a single network node, a reconfigurable intelligent surface control signal, a cyclic redundancy check, or a combination thereof of a control payload of the control information is scrambled with a reconfigurable intelligent surface identifier, and the reconfigurable intelligent surface synchronization signal is generated based on a cyclic shift associated with a reconfigurable intelligent surface identifier.

In certain embodiments, in response to a reconfigurable intelligent surface being used for multiple cells, the reconfigurable intelligent surface is configured with cell identifiers of cells that use the reconfigurable intelligent surface for transmission, and reconfigurable intelligent surface synchronization signals and the control information are generated based on, scrambled, or a combination thereof with a cell identifier of the cell identifiers. In some embodiments, the control information is transmitted in a reconfigurable intelligent surface control channel, and a bit field having multiple bits in a control payload of the control information indicates an index corresponding to a predetermined phase shift matrix stored in the controller. In various embodiments, a control payload of the control information comprises a one-bit field, a 0 in the one-bit field indicates to switch a reflection off, and 1 in the one-bit field indicates to switch the reflection on.

In one embodiment, a slot format indication for uplink switching, downlink switching, or a combination thereof is included in a control payload of the control information to enable a phase shift matrix index for uplink, a phase shift matrix index for downlink, or a combination thereof. In certain embodiments, the control information comprises a downlink phase shift matrix index and an offset, and the offset applied to the downlink phase shift matrix index indicates an uplink phase shift matrix index. In some embodiments, the method 1400 further comprises receiving a bit field in a control payload of the control information, wherein the bit field indicates beam sweeping of a beamformed reflection from a reconfigurable intelligent surface of the second network device.

In various embodiments, the method 1400 further comprises receiving, at the controller, a starting phase shift matrix index, and information indicating whether to apply beam sweeping by selecting a suitable phase shift matrix index offset from a phase shift matrix index for each slot. In one embodiment, the method 1400 further comprises receiving, at the controller, an indication of a number of slots for each phase shift matrix index of a plurality of phase shift matrix indexes to be applied. In certain embodiments, the control information is transmitted using predetermined sequences located in predetermined symbols and generated with predetermined cyclic shifts, and each sequence of the predetermined sequences corresponds to bits of the payload that carry the control information.

In some embodiments, a reconfigurable intelligent surface control payload of the control information is divided into a plurality of parts, each part of the plurality of part is used to generate a corresponding sequence by cyclic shifting a base sequence based on a bit field of the part, the controller applies a correlation search for each symbol to detect bits, and the controller concatenates results from different symbols to retrieve the reconfigurable intelligent surface control payload. In various embodiments, each symbol of a control payload of the control information carries a specific bit field or sequence, a phase shift matrix index is sent using a first symbol, a number of affected slots is sent in a second symbol, and a slot format indication is sent in a third symbol.

In one embodiment, receiving the control information comprises receiving on-off patterns produced by switching off a transmission of some symbols and receiving signals in other symbols so that a pattern of 0 s and 1 s is retrieved by the second network device, and the pattern indicates specific reconfigurable intelligent surface control information. In certain embodiments, receiving the control information comprises receiving at least one symbol masked with an on-off pattern having a predetermined length to carry specific reconfigurable intelligent surface control information. In some embodiments, the control information is sent in a separate frequency band, in a separate bandwidth part, in a specific carrier, or some combination thereof to avoid in-band interference with another transmission.

In various embodiments, the control information comprises an angle of departure, an angle of reflection, or a combination thereof, and the controller uses the angle of departure, the angle of reflection, or the combination thereof to determine reflection coefficients, phase shifts, or a combination thereof for reflecting a signal. In one embodiment, the control information comprises a beamwidth of a reflected signal, and the controller uses the beamwidth to determine reflection coefficients, phase shifts, or a combination thereof to apply to reconfigurable intelligent surface elements to focus a signal. In certain embodiments, the control information comprises an offset to a previously indicated angle of departure and a previously indicated beamwidth.

In one embodiment, a method comprises: transmitting, from a first network device, a synchronization signal based on a control frame structure to a second network device comprising a digitally controlled surface having reflective elements; and transmitting control information based on the control frame structure to a controller of the second network device, wherein the control information is transmitted at least partly using a dedicated physical control channel, a sequence, an on-off pattern, or a combination thereof.

In certain embodiments, the synchronization symbol is sent prior to the control information for time synchronization between the first network device and the second network device.

In some embodiments, the method further comprises transmitting the control frame structure to the second network device on predetermined resources, at a predetermined periodicity, or a combination thereof.

In various embodiments, the control information comprises a first transmission including at least one index corresponding to a location of a reconfigurable intelligent surface control channel, and a second transmission including a control payload located in predetermined slots with a predetermined periodicity.

In one embodiment, in response to multiple reconfigurable intelligent surfaces being used for a single network node, a reconfigurable intelligent surface control signal, a cyclic redundancy check, or a combination thereof of a control payload of the control information is scrambled with a reconfigurable intelligent surface identifier, and the reconfigurable intelligent surface synchronization signal is generated based on a cyclic shift associated with a reconfigurable intelligent surface identifier.

In certain embodiments, in response to a reconfigurable intelligent surface being used for multiple cells, the reconfigurable intelligent surface is configured with cell identifiers of cells that use the reconfigurable intelligent surface for transmission, and reconfigurable intelligent surface synchronization signals and the control information are generated based on, scrambled, or a combination thereof with a cell identifier of the cell identifiers.

In some embodiments, the control information is transmitted in a reconfigurable intelligent surface control channel, and a bit field having multiple bits in a control payload of the control information indicates an index corresponding to a predetermined phase shift matrix stored in the controller.

In various embodiments, a control payload of the control information comprises a one-bit field, a 0 in the one-bit field indicates to switch a reflection off, and 1 in the one-bit field indicates to switch the reflection on.

In one embodiment, a slot format indication for uplink switching, downlink switching, or a combination thereof is included in a control payload of the control information to enable a phase shift matrix index for uplink, a phase shift matrix index for downlink, or a combination thereof.

In certain embodiments, the control information comprises a downlink phase shift matrix index and an offset, and the offset applied to the downlink phase shift matrix index indicates an uplink phase shift matrix index.

In some embodiments, the method further comprises transmitting a bit field in a control payload of the control information, wherein the bit field indicates beam sweeping of a beamformed reflection from a reconfigurable intelligent surface of the second network device.

In various embodiments, the method further comprises indicating, to the controller, a starting phase shift matrix index, and indicating whether to apply beam sweeping by selecting a suitable phase shift matrix index offset from a phase shift matrix index for each slot.

In one embodiment, the method further comprises transmitting, to the controller, an indication of a number of slots for each phase shift matrix index of a plurality of phase shift matrix indexes to be applied.

In certain embodiments, the method further comprises forming a database comprising mappings between phase shift matrix indexes and user equipment locations by dividing a reconfigurable intelligent surface coverage of the second network device into zones, and an index corresponding to the mapping of a phase shift matrix index for a certain location is indicated to the controller instead of indicating the phase shift matrix index.

In some embodiments, the control information is transmitted using predetermined sequences located in predetermined symbols and generated with predetermined cyclic shifts, and each sequence of the predetermined sequences corresponds to bits of the payload that carry the control information.

In various embodiments, a reconfigurable intelligent surface control payload of the control information is divided into a plurality of parts, each part of the plurality of part is used to generate a corresponding sequence by cyclic shifting a base sequence based on a bit field of the part, the controller applies a correlation search for each symbol to detect bits, and the controller concatenates results from different symbols to retrieve the reconfigurable intelligent surface control payload.

In one embodiment, each symbol of a control payload of the control information carries a specific bit field or sequence, a phase shift matrix index is sent using a first symbol, a number of affected slots is sent in a second symbol, and a slot format indication is sent in a third symbol.

In certain embodiments, transmitting the control information comprises using on-off patterns produced by switching off a transmission of some symbols and transmitting signals in other symbols so that a pattern of 0 s and 1 s is retrieved by the second network device, and the pattern indicates specific reconfigurable intelligent surface control information.

In some embodiments, transmitting the control information comprises masking at least one symbol with an on-off pattern having a predetermined length to carry specific reconfigurable intelligent surface control information.

In various embodiments, the control information is sent in a separate frequency band, in a separate bandwidth part, in a specific carrier, or some combination thereof to avoid in-band interference with another transmission.

In one embodiment, the control information comprises an angle of departure, an angle of reflection, or a combination thereof, and the controller uses the angle of departure, the angle of reflection, or the combination thereof to determine reflection coefficients, phase shifts, or a combination thereof for reflecting a signal.

In certain embodiments, the control information comprises a beamwidth of a reflected signal, and the controller uses the beamwidth to determine reflection coefficients, phase shifts, or a combination thereof to apply to reconfigurable intelligent surface elements to focus a signal.

In some embodiments, the control information comprises an offset to a previously indicated angle of departure and a previously indicated beamwidth.

In one embodiment, an apparatus comprises a first network device. The apparatus further comprises: a transmitter that: transmits a synchronization signal based on a control frame structure to a second network device comprising a digitally controlled surface having reflective elements; and transmits control information based on the control frame structure to a controller of the second network device, wherein the control information is transmitted at least partly using a dedicated physical control channel, a sequence, an on-off pattern, or a combination thereof.

In certain embodiments, the synchronization symbol is sent prior to the control information for time synchronization between the first network device and the second network device.

In some embodiments, the transmitter transmits the control frame structure to the second network device on predetermined resources, at a predetermined periodicity, or a combination thereof.

In various embodiments, the control information comprises a first transmission including at least one index corresponding to a location of a reconfigurable intelligent surface control channel, and a second transmission including a control payload located in predetermined slots with a predetermined periodicity.

In one embodiment, in response to multiple reconfigurable intelligent surfaces being used for a single network node, a reconfigurable intelligent surface control signal, a cyclic redundancy check, or a combination thereof of a control payload of the control information is scrambled with a reconfigurable intelligent surface identifier, and the reconfigurable intelligent surface synchronization signal is generated based on a cyclic shift associated with a reconfigurable intelligent surface identifier.

In certain embodiments, in response to a reconfigurable intelligent surface being used for multiple cells, the reconfigurable intelligent surface is configured with cell identifiers of cells that use the reconfigurable intelligent surface for transmission, and reconfigurable intelligent surface synchronization signals and the control information are generated based on, scrambled, or a combination thereof with a cell identifier of the cell identifiers.

In some embodiments, the control information is transmitted in a reconfigurable intelligent surface control channel, and a bit field having multiple bits in a control payload of the control information indicates an index corresponding to a predetermined phase shift matrix stored in the controller.

In various embodiments, a control payload of the control information comprises a one-bit field, a 0 in the one-bit field indicates to switch a reflection off, and 1 in the one-bit field indicates to switch the reflection on.

In one embodiment, a slot format indication for uplink switching, downlink switching, or a combination thereof is included in a control payload of the control information to enable a phase shift matrix index for uplink, a phase shift matrix index for downlink, or a combination thereof.

In certain embodiments, the control information comprises a downlink phase shift matrix index and an offset, and the offset applied to the downlink phase shift matrix index indicates an uplink phase shift matrix index.

In some embodiments, the transmitter transmits a bit field in a control payload of the control information, and the bit field indicates beam sweeping of a beamformed reflection from a reconfigurable intelligent surface of the second network device.

In various embodiments, the method further comprises a processor that indicates, to the controller, a starting phase shift matrix index, and indicating whether to apply beam sweeping by selecting a suitable phase shift matrix index offset from a phase shift matrix index for each slot.

In one embodiment, the transmitter transmits, to the controller, an indication of a number of slots for each phase shift matrix index of a plurality of phase shift matrix indexes to be applied.

In certain embodiments, the apparatus further comprises a processor that forms a database comprising mappings between phase shift matrix indexes and user equipment locations by dividing a reconfigurable intelligent surface coverage of the second network device into zones, and an index corresponding to the mapping of a phase shift matrix index for a certain location is indicated to the controller instead of indicating the phase shift matrix index.

In some embodiments, the control information is transmitted using predetermined sequences located in predetermined symbols and generated with predetermined cyclic shifts, and each sequence of the predetermined sequences corresponds to bits of the payload that carry the control information.

In various embodiments, a reconfigurable intelligent surface control payload of the control information is divided into a plurality of parts, each part of the plurality of part is used to generate a corresponding sequence by cyclic shifting a base sequence based on a bit field of the part, the controller applies a correlation search for each symbol to detect bits, and the controller concatenates results from different symbols to retrieve the reconfigurable intelligent surface control payload.

In one embodiment, each symbol of a control payload of the control information carries a specific bit field or sequence, a phase shift matrix index is sent using a first symbol, a number of affected slots is sent in a second symbol, and a slot format indication is sent in a third symbol.

In certain embodiments, the apparatus further comprises a processor, wherein the transmitter transmitting the control information comprises the processor using on-off patterns produced by switching off a transmission of some symbols and the transmitter transmitting signals in other symbols so that a pattern of 0 s and 1 s is retrieved by the second network device, and the pattern indicates specific reconfigurable intelligent surface control information.

In some embodiments, the apparatus further comprises a processor, wherein the transmitter transmitting the control information comprises the processor masking at least one symbol with an on-off pattern having a predetermined length to carry specific reconfigurable intelligent surface control information.

In various embodiments, the control information is sent in a separate frequency band, in a separate bandwidth part, in a specific carrier, or some combination thereof to avoid in-band interference with another transmission.

In one embodiment, the control information comprises an angle of departure, an angle of reflection, or a combination thereof, and the controller uses the angle of departure, the angle of reflection, or the combination thereof to determine reflection coefficients, phase shifts, or a combination thereof for reflecting a signal.

In certain embodiments, the control information comprises a beamwidth of a reflected signal, and the controller uses the beamwidth to determine reflection coefficients, phase shifts, or a combination thereof to apply to reconfigurable intelligent surface elements to focus a signal.

In some embodiments, the control information comprises an offset to a previously indicated angle of departure and a previously indicated beamwidth.

In one embodiment, a method comprises: receiving a synchronization signal based on a control frame structure at a second network device comprising a digitally controlled surface having reflective elements; and receiving control information based on the control frame structure at a controller of the second network device, wherein the control information is received at least partly using a dedicated physical control channel, a sequence, an on-off pattern, or a combination thereof.

In certain embodiments, the synchronization symbol is sent prior to the control information for time synchronization between the first network device and the second network device.

In some embodiments, the method further comprises receiving the control frame structure at the second network device on predetermined resources, at a predetermined periodicity, or a combination thereof.

In various embodiments, the control information comprises a first transmission including at least one index corresponding to a location of a reconfigurable intelligent surface control channel, and a second transmission including a control payload located in predetermined slots with a predetermined periodicity.

In one embodiment, in response to multiple reconfigurable intelligent surfaces being used for a single network node, a reconfigurable intelligent surface control signal, a cyclic redundancy check, or a combination thereof of a control payload of the control information is scrambled with a reconfigurable intelligent surface identifier, and the reconfigurable intelligent surface synchronization signal is generated based on a cyclic shift associated with a reconfigurable intelligent surface identifier.

In certain embodiments, in response to a reconfigurable intelligent surface being used for multiple cells, the reconfigurable intelligent surface is configured with cell identifiers of cells that use the reconfigurable intelligent surface for transmission, and reconfigurable intelligent surface synchronization signals and the control information are generated based on, scrambled, or a combination thereof with a cell identifier of the cell identifiers.

In some embodiments, the control information is transmitted in a reconfigurable intelligent surface control channel, and a bit field having multiple bits in a control payload of the control information indicates an index corresponding to a predetermined phase shift matrix stored in the controller.

In various embodiments, a control payload of the control information comprises a one-bit field, a 0 in the one-bit field indicates to switch a reflection off, and 1 in the one-bit field indicates to switch the reflection on.

In one embodiment, a slot format indication for uplink switching, downlink switching, or a combination thereof is included in a control payload of the control information to enable a phase shift matrix index for uplink, a phase shift matrix index for downlink, or a combination thereof.

In certain embodiments, the control information comprises a downlink phase shift matrix index and an offset, and the offset applied to the downlink phase shift matrix index indicates an uplink phase shift matrix index.

In some embodiments, the method further comprises receiving a bit field in a control payload of the control information, wherein the bit field indicates beam sweeping of a beamformed reflection from a reconfigurable intelligent surface of the second network device.

In various embodiments, the method further comprises receiving, at the controller, a starting phase shift matrix index, and information indicating whether to apply beam sweeping by selecting a suitable phase shift matrix index offset from a phase shift matrix index for each slot.

In one embodiment, the method further comprises receiving, at the controller, an indication of a number of slots for each phase shift matrix index of a plurality of phase shift matrix indexes to be applied.

In certain embodiments, the control information is transmitted using predetermined sequences located in predetermined symbols and generated with predetermined cyclic shifts, and each sequence of the predetermined sequences corresponds to bits of the payload that carry the control information.

In some embodiments, a reconfigurable intelligent surface control payload of the control information is divided into a plurality of parts, each part of the plurality of part is used to generate a corresponding sequence by cyclic shifting a base sequence based on a bit field of the part, the controller applies a correlation search for each symbol to detect bits, and the controller concatenates results from different symbols to retrieve the reconfigurable intelligent surface control payload.

In various embodiments, each symbol of a control payload of the control information carries a specific bit field or sequence, a phase shift matrix index is sent using a first symbol, a number of affected slots is sent in a second symbol, and a slot format indication is sent in a third symbol.

In one embodiment, receiving the control information comprises receiving on-off patterns produced by switching off a transmission of some symbols and receiving signals in other symbols so that a pattern of 0 s and 1 s is retrieved by the second network device, and the pattern indicates specific reconfigurable intelligent surface control information.

In certain embodiments, receiving the control information comprises receiving at least one symbol masked with an on-off pattern having a predetermined length to carry specific reconfigurable intelligent surface control information.

In some embodiments, the control information is sent in a separate frequency band, in a separate bandwidth part, in a specific carrier, or some combination thereof to avoid in-band interference with another transmission.

In various embodiments, the control information comprises an angle of departure, an angle of reflection, or a combination thereof, and the controller uses the angle of departure, the angle of reflection, or the combination thereof to determine reflection coefficients, phase shifts, or a combination thereof for reflecting a signal.

In one embodiment, the control information comprises a beamwidth of a reflected signal, and the controller uses the beamwidth to determine reflection coefficients, phase shifts, or a combination thereof to apply to reconfigurable intelligent surface elements to focus a signal.

In certain embodiments, the control information comprises an offset to a previously indicated angle of departure and a previously indicated beamwidth.

In one embodiment, an apparatus comprises a second network device comprising a digitally controlled surface having reflective elements. The apparatus further comprises: a receiver that: receives a synchronization signal based on a control frame structure; and receives control information based on the control frame structure at a controller of the second network device, wherein the control information is received at least partly using a dedicated physical control channel, a sequence, an on-off pattern, or a combination thereof.

In certain embodiments, the synchronization symbol is sent prior to the control information for time synchronization between the first network device and the second network device.

In some embodiments, the receiver receives the control frame structure at the second network device on predetermined resources, at a predetermined periodicity, or a combination thereof.

In various embodiments, the control information comprises a first transmission including at least one index corresponding to a location of a reconfigurable intelligent surface control channel, and a second transmission including a control payload located in predetermined slots with a predetermined periodicity.

In one embodiment, in response to multiple reconfigurable intelligent surfaces being used for a single network node, a reconfigurable intelligent surface control signal, a cyclic redundancy check, or a combination thereof of a control payload of the control information is scrambled with a reconfigurable intelligent surface identifier, and the reconfigurable intelligent surface synchronization signal is generated based on a cyclic shift associated with a reconfigurable intelligent surface identifier.

In certain embodiments, in response to a reconfigurable intelligent surface being used for multiple cells, the reconfigurable intelligent surface is configured with cell identifiers of cells that use the reconfigurable intelligent surface for transmission, and reconfigurable intelligent surface synchronization signals and the control information are generated based on, scrambled, or a combination thereof with a cell identifier of the cell identifiers.

In some embodiments, the control information is transmitted in a reconfigurable intelligent surface control channel, and a bit field having multiple bits in a control payload of the control information indicates an index corresponding to a predetermined phase shift matrix stored in the controller.

In various embodiments, a control payload of the control information comprises a one-bit field, a 0 in the one-bit field indicates to switch a reflection off, and 1 in the one-bit field indicates to switch the reflection on.

In one embodiment, a slot format indication for uplink switching, downlink switching, or a combination thereof is included in a control payload of the control information to enable a phase shift matrix index for uplink, a phase shift matrix index for downlink, or a combination thereof.

In certain embodiments, the control information comprises a downlink phase shift matrix index and an offset, and the offset applied to the downlink phase shift matrix index indicates an uplink phase shift matrix index.

In some embodiments, the receiver receives a bit field in a control payload of the control information, and the bit field indicates beam sweeping of a beamformed reflection from a reconfigurable intelligent surface of the second network device.

In various embodiments, the receiver receives, at the controller, a starting phase shift matrix index, and information indicating whether to apply beam sweeping by selecting a suitable phase shift matrix index offset from a phase shift matrix index for each slot.

In one embodiment, the receiver receives, at the controller, an indication of a number of slots for each phase shift matrix index of a plurality of phase shift matrix indexes to be applied.

In certain embodiments, the control information is transmitted using predetermined sequences located in predetermined symbols and generated with predetermined cyclic shifts, and each sequence of the predetermined sequences corresponds to bits of the payload that carry the control information.

In some embodiments, a reconfigurable intelligent surface control payload of the control information is divided into a plurality of parts, each part of the plurality of part is used to generate a corresponding sequence by cyclic shifting a base sequence based on a bit field of the part, the controller applies a correlation search for each symbol to detect bits, and the controller concatenates results from different symbols to retrieve the reconfigurable intelligent surface control payload.

In various embodiments, each symbol of a control payload of the control information carries a specific bit field or sequence, a phase shift matrix index is sent using a first symbol, a number of affected slots is sent in a second symbol, and a slot format indication is sent in a third symbol.

In one embodiment, the receiver receiving the control information comprises the receiver receiving on-off patterns produced by switching off a transmission of some symbols and receiving signals in other symbols so that a pattern of 0 s and 1 s is retrieved by the second network device, and the pattern indicates specific reconfigurable intelligent surface control information.

In certain embodiments, the receiver receiving the control information comprises the receiver receiving at least one symbol masked with an on-off pattern having a predetermined length to carry specific reconfigurable intelligent surface control information.

In some embodiments, the control information is sent in a separate frequency band, in a separate bandwidth part, in a specific carrier, or some combination thereof to avoid in-band interference with another transmission.

In various embodiments, the control information comprises an angle of departure, an angle of reflection, or a combination thereof, and the controller uses the angle of departure, the angle of reflection, or the combination thereof to determine reflection coefficients, phase shifts, or a combination thereof for reflecting a signal.

In one embodiment, the control information comprises a beamwidth of a reflected signal, and the controller uses the beamwidth to determine reflection coefficients, phase shifts, or a combination thereof to apply to reconfigurable intelligent surface elements to focus a signal.

In certain embodiments, the control information comprises an offset to a previously indicated angle of departure and a previously indicated beamwidth.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a first network device, the method comprising:
transmitting a synchronization signal based on a frame structure to a second network device comprising a reconfigurable intelligent surface (RIS); and
transmitting control information to the second network device in accordance with the frame structure and based on a sequence or a pattern, or a combination thereof, wherein the control information includes at least one index corresponding to a location associated with a channel for communication with the second network device comprising the RIS.

2. A first network device, comprising:
at least one memory; and
at least one processor coupled with the at least one memory and configured to cause the first network device to:
transmit a synchronization signal based on a frame structure to a second network device comprising a reconfigurable intelligent surface (RIS); and
transmit control information to the second network device in accordance with the frame structure and based on a sequence or an pattern, or a combination thereof, wherein the control information includes at least one index corresponding to a location associated with a channel for communication with the second network device comprising the RIS.

3. The first network device of claim 2, wherein a second transmission including a control payload located in predetermined slots with a predetermined periodicity.

4. The first network device of claim 2, wherein, in response to multiple RISs being used for a single network node, a RIS control signal, a cyclic redundancy check, or a combination thereof of a control payload of the control information is scrambled with a RIS identifier, and the RIS control signal is generated based on a cyclic shift associated with a RIS identifier.

5. The first network device of claim 2, wherein, in response to a RIS being used for multiple cells, the RIS is configured with cell identifiers of cells that use the RIS for transmission, and RIS synchronization signals and the control information are generated based on, scrambled, or a combination thereof with a cell identifier of the cell identifiers.

6. The first network device of claim 2, wherein the control information is transmitted in a RIS control channel, and a bit field having multiple bits in a control payload of the control information indicates an index corresponding to a predetermined phase shift matrix stored in a controller.

7. The first network device of claim 2, wherein a slot format indication for uplink switching, downlink switching, or a combination thereof is included in a control payload of the control information to enable a phase shift matrix index for uplink, a phase shift matrix index for downlink, or a combination thereof.

8. The first network device of claim 2, wherein the at least one processor is configured to cause the first network device to transmit a bit field in a control payload of the control information, the bit field indicates beam sweeping of a beamformed reflection from a RIS of the second network device, a phase shift matrix index to start with, and a number of slots for each phase shift matrix index of a plurality of phase shift matrix indexes to be applied.

9. The first network device of claim 2, wherein the control information is transmitted using predetermined sequences located in predetermined symbols and generated with predetermined cyclic shifts, and each sequence of the predetermined sequences corresponds to bits of a payload that carry the control information.

10. The first network device of claim 2, wherein the at least one processor is configured to cause the first network device to use on-off patterns produced by switching off a transmission of some symbols and signal in other symbols so that a pattern of 0 s and 1 s retrieved by the second network device, and the pattern indicates specific RIS control information.

11. The first network device of claim 2, wherein the control information comprises an angle of departure, an angle of reflection, a beamwidth, or a combination thereof, and a controller uses the angle of departure, the angle of reflection, the beamwidth, or the combination thereof to determine reflection coefficients, phase shifts, or a combination thereof for reflecting a signal.

12. A second network device, comprising:
a digitally controlled surface comprising a reconfigurable intelligent surface (RIS);
at least one memory; and
at least one processor coupled with the at least one memory and configured to cause the second network device to:
receive a synchronization signal based on a frame structure; and
receive control information in accordance with the frame structure and based on a sequence, or a pattern, or a combination thereof, and the control information includes at least one index corresponding to a location associated with a channel for communication with the RIS.

13. The second network device of claim 12, wherein a second transmission including a control payload located in predetermined slots with a predetermined periodicity.

14. The second network device of claim 12, wherein, in response to multiple RISs being used for a single network node, a RIS control signal, a cyclic redundancy check, or a combination thereof of a control payload of the control information is scrambled with a RIS identifier, and the RIS control signal is generated based on a cyclic shift associated with a RIS identifier.

15. The second network device of claim 12, wherein, in response to a RIS being used for multiple cells, the RIS is configured with cell identifiers of cells that use the RIS for transmission, and RIS synchronization signals and the control information are generated based on, scrambled, or a combination thereof with a cell identifier of the cell identifiers.

16. The second network device of claim 12, wherein the control information is transmitted in a RIS control channel, and a bit field having multiple bits in a control payload of the control information indicates an index corresponding to a predetermined phase shift matrix stored in a controller.

17. The second network device of claim 12, wherein a slot format indication for uplink switching, downlink switching, or a combination thereof is included in a control payload of the control information to enable a phase shift matrix index for uplink, a phase shift matrix index for downlink, or a combination thereof.

18. The second network device of claim 12, wherein the at least one processor is configured to cause the second network device to receive a bit field in a control payload of the control information, the bit field indicates beam sweeping of a beamformed reflection from a RIS of the second network device, a phase shift matrix index to start with, and a number of slots for each phase shift matrix index of a plurality of phase shift matrix indexes to be applied.

19. The second network device of claim 12, wherein the control information is transmitted using predetermined sequences located in predetermined symbols and generated with predetermined cyclic shifts, and each sequence of the predetermined sequences corresponds to bits of a payload that carry the control information.

20. A method performed by a second network device, the method comprising:
   receiving a synchronization signal based on a frame structure; and
   receiving control information in accordance with the frame structure and based on a sequence, or a pattern, or a combination thereof, and the control information includes at least one index corresponding to a location associated with a channel for communication with a reconfigurable intelligent surface (RIS) of the second network device.

* * * * *